US012506620B2

(12) United States Patent
Pan et al.

(10) Patent No.: US 12,506,620 B2
(45) Date of Patent: Dec. 23, 2025

(54) CERTIFICATE APPLICATION METHOD AND DEVICE

(71) Applicant: SHENZHEN YINWANG INTELLIGENT TECHNOLOGIES CO., LTD., Shenzhen (CN)

(72) Inventors: Kai Pan, Shanghai (CN); Min Li, Nanjing (CN); Jing Chen, Shanghai (CN)

(73) Assignee: Shenzhen Yinwang Intelligent Technologies Co., Ltd.

( * ) Notice: Subject to any disclaimer, the term of this patent is extended or adjusted under 35 U.S.C. 154(b) by 230 days.

(21) Appl. No.: 17/841,369

(22) Filed: Jun. 15, 2022

(65) Prior Publication Data

US 2022/0311625 A1    Sep. 29, 2022

Related U.S. Application Data

(63) Continuation of application No. PCT/CN2020/127562, filed on Nov. 9, 2020.

(30) Foreign Application Priority Data

Dec. 18, 2019    (CN) .......................... 201911308628.7

(51) Int. Cl.
*H04L 9/32*    (2006.01)
*H04L 9/08*    (2006.01)

(52) U.S. Cl.
CPC .......... *H04L 9/3263* (2013.01); *H04L 9/0825* (2013.01); *H04L 9/3268* (2013.01)

(58) Field of Classification Search
CPC .......................... H04L 9/3268; H04L 9/0825
USPC ........................................................ 713/156
See application file for complete search history.

(56) References Cited

U.S. PATENT DOCUMENTS

| 7,171,555 | B1 * | 1/2007 | Salowey ........... H04W 12/0471 |
| | | | 713/168 |
| 2008/0114984 | A1 | 5/2008 | Srinivasan et al. |
| 2010/0241851 | A1 | 9/2010 | Truskovsky et al. |

(Continued)

FOREIGN PATENT DOCUMENTS

| CN | 102905260 A | 1/2013 |
| CN | 107135081 A | 9/2017 |

(Continued)

OTHER PUBLICATIONS

Pulipati, Getting Started with Apple Certificates, Jun. 26, 2018, https://basecamp.temenos.com/s/article-detail/a046A00000AV9ceQAD/getting-started-with-apple-certificates (Year: 2018).*

(Continued)

*Primary Examiner* — Zi Ye
(74) *Attorney, Agent, or Firm* — Fish & Richardson P.C.

(57) ABSTRACT

An example terminal device includes at least one processor and at least one memory coupled to the at least one processor and storing programming instructions for execution by the at least one processor to send a certificate application parameter to an interface adaptation function entity; and receive a certificate from the interface adaptation function entity, wherein the certificate is configured by a target certificate management function entity for the terminal device.

28 Claims, 10 Drawing Sheets

(56) References Cited

U.S. PATENT DOCUMENTS

| | | | |
|---|---|---|---|
| 2011/0116637 A1* | 5/2011 | Schiefelbein | H04L 63/0823 380/286 |
| 2012/0290835 A1* | 11/2012 | Truskovsky | H04L 63/0823 713/156 |
| 2014/0013105 A1 | 1/2014 | Niemeyer | |
| 2016/0087804 A1* | 3/2016 | Park | H04L 9/3268 713/156 |
| 2016/0112206 A1 | 4/2016 | Cizas et al. | |
| 2017/0093587 A1* | 3/2017 | Glisson | H04L 63/062 |
| 2018/0060608 A1* | 3/2018 | Holden | G06Q 20/38215 |
| 2019/0123914 A1* | 4/2019 | Wei | H04L 9/3247 |

FOREIGN PATENT DOCUMENTS

| | | |
|---|---|---|
| CN | 107612697 A | 1/2018 |
| CN | 108848496 A | 11/2018 |
| EP | 3174324 A1 | 5/2017 |
| EP | 3291504 A2 | 3/2018 |
| JP | H096236 A | 1/1997 |
| JP | 2001320356 A | 11/2001 |
| JP | 2002014613 A | 1/2002 |
| JP | 2005157858 A | 6/2005 |
| JP | 2012065207 A | 3/2012 |
| JP | 2012100188 A | 5/2012 |

OTHER PUBLICATIONS

Stackoverflow, verify if server certificate matches with root CA certificate, Dec. 5, 2013, https://stackoverflow.com/questions/25482199/verify-a-certificate-chain-using-openssl-verify (Year: 2013).*

Mike, Certificate Management—FortiAuthenticator 4.0, Apr. 25, 2016, https://www.fortinetguru.com/2016/04/certificate-management-fortiauthenticator-4-0/2/ (Year: 2016).*

Office Action in Japanese Appln. No. 2022-537783, mailed on Jul. 18, 2023, 11 pages (with English translation).

Office Action in Chinese Appln. No. 201911308628.7, dated May 25, 2022, 41 pages (with English translation).

Extended European Search Report in European Appln No. 20903666.4, dated Dec. 15, 2022, 7 pages.

International Search Report and Written Opinion in International Appln. No. PCT/CN2020/127562, mailed on Jan. 28, 2021, 15 pages (with English translation).

* cited by examiner

CERTIFICATE APPLICATION METHOD AND DEVICE

CROSS-REFERENCE TO RELATED APPLICATIONS

This application is a continuation of International Application No. PCT/CN2020/127562, filed on Nov. 9, 2020, which claims priority to Chinese Patent Application No. 201911308628.7, filed on Dec. 18, 2019. The disclosures of the aforementioned applications are hereby incorporated by reference in their entireties.

TECHNICAL FIELD

This application relates to the field of communications technologies, and in particular, to a certificate application method and a device.

BACKGROUND

Security of data transmission in a communications system is of great significance in many scenarios. Currently, the communications system usually implements security of data transmission in a manner of combining an encryption algorithm with a certificate mechanism, to ensure that a message received by a receiving device is authentic and reliable and is not tampered with/forged by an attacker.

In this manner, a terminal device A needs to apply for a certificate from a certificate management function entity, and then send a message obtained after signature processing and the certificate to a terminal device B. In this way, the terminal device B can determine that the message is authentic, reliable, and secure after signature and certificate verification succeeds. The certificate management function entity may be, but is not limited to, a public key infrastructure (PKI) or a certificate management (certificate authorization or certificate issuance) authority (Certificate Authority, CA).

It is well-known that a process of interaction between the terminal device and the certificate management function entity needs to be implemented through a corresponding interface. However, as services vary, there are many potential construction institutions, for example, a ministry of public security, a ministry of transportation, and another conventional PKI vendor in a vehicle to everything (V2X) communications system, for certificate management function entities. Adopted interface solutions are different when the institutions each deploy a certificate management function entity. Therefore, a plurality of interfaces need to be set inside the terminal device, to ensure that the terminal device can interact with and interwork with different certificate management function entities. This reduces idle storage space of the terminal device, increases development costs, and prolongs a development period of the terminal device.

SUMMARY

This application provides a certificate application method and a device, to reduce, on the basis of ensuring that a terminal device can interact with different certificate management function entities, a quantity of interfaces inside the terminal device for interacting with the certificate management function entities.

According to a first aspect, an embodiment of this application provides a certificate application method, applied to a certificate management architecture shown in FIG. 2. The certificate management architecture includes terminal devices, an interface adaptation function entity set with an interface for interacting with at least one certificate management function entity, and certificate management function entities. The method includes: The terminal device sends a certificate application parameter to the interface adaptation function entity. The terminal device receives a certificate from the interface adaptation function entity, where the certificate is configured by a target certificate management function entity for the terminal device.

In this method, the interface adaptation function entity can apply for the certificate from the target certificate management function entity for the terminal device based on the certificate application parameter sent by the terminal device. The interface adaptation function entity can shield implementation or deployment of the certificate management function entity from the terminal device, so that the terminal device can be unaware of the certificate management function entity at an upper layer. Therefore, the terminal device does not need to locally set an interface for interacting with the certificate management function entity. This method can reduce, on the basis of ensuring that the terminal device can interact with different certificate management function entities, a quantity of interfaces inside the terminal device for interacting with the certificate management function entities.

In a possible design, after the terminal device sends the certificate application parameter to the interface adaptation function entity, and before the terminal device receives the certificate from the interface adaptation function entity, the terminal device receives a certificate request message from the interface adaptation function entity, where the certificate request message includes the certificate application parameter. Then, the terminal device performs signature processing on the certificate request message, and sends the certificate request message obtained after signature processing to the interface adaptation function entity, so that the interface adaptation function entity forwards the certificate request message obtained after signature processing to the target certificate management function entity.

In this design, the terminal device can perform signature processing on the certificate request message. In this way, after the certificate request message is transmitted to the target certificate management function entity, the target certificate management function entity can prove, based on the signature, that the certificate request message is sent by the terminal device and is authentic and valid.

In a possible design, the terminal device may receive the certificate from the interface adaptation function entity in the following manner: The terminal device receives a certificate response message from the interface adaptation function entity, where the certificate response message is received by the interface adaptation function entity from the target certificate management function entity, and the certificate response message includes the certificate. In this design, the terminal device can successfully receive the certificate. Optionally, the certificate response message may be sent after the target certificate management function entity performs signature processing on the certificate response message. In this way, the terminal device can prove, based on the signature, that the certificate response message is sent by the target certificate management function entity and is authentic and valid.

In a possible design, before the terminal device receives the certificate from the interface adaptation function entity, the terminal device sends information about the target certificate management function entity to the interface adaptation function entity.

In this design, the terminal device can notify the interface adaptation function entity in advance of the target certificate management function entity that configures the certificate for the terminal device.

In a possible design, after the terminal device sends the information about the target certificate management function entity to the interface adaptation function entity, the terminal device receives a notification message from the interface adaptation function entity, where the notification message is used to notify the terminal device that a target interface for interacting with the target certificate management function entity is set in the interface adaptation function entity.

In this design, the interface adaptation function entity can notify the terminal device that there is the locally set target interface, where the target interface can be used to apply for the certificate for the terminal device, or can notify the terminal device to send the certificate application parameter.

In a possible design, the notification message includes a root certificate of the target certificate management function entity. In this scenario, after the terminal device receives the certificate response message from the interface adaptation function entity, the terminal device verifies, based on the root certificate of the target certificate management function entity, the certificate included in the certificate response message. For example, the terminal device decrypts the certificate by using the root certificate of the target certificate management function entity, and then determines whether information obtained after decryption includes a public key of the terminal device. If the information includes the public key of the terminal device, it is determined that the certificate verification succeeds, and the terminal device may perform secure data communication by using the certificate; or if the information does not include the public key of the terminal device, it is determined that the certificate verification fails, and the terminal device cannot use the certificate.

In this design, after receiving the certificate, the terminal device can verify the received certificate based on the received root certificate, to verify security of the received certificate.

In a possible design, before the terminal device sends the information about the target certificate management function entity to the interface adaptation function entity, the terminal device receives information about at least one certificate management function entity from the interface adaptation function entity, where the information about the at least one certificate management function entity includes the information about the target certificate management function entity, and an interface for interacting with the at least one certificate management function entity is set in the interface adaptation function entity. The terminal device selects the target certificate management function entity from the at least one certificate management function entity.

In this design, the interface adaptation function entity can notify the terminal device of the at least one certificate management function entity with which the interface adaptation function entity can interact, so that the terminal device can select, from the at least one certificate management function entity, the target certificate management function entity from which the certificate is applied for.

In a possible design, before the terminal device sends the certificate application parameter to the interface adaptation function entity, the terminal device establishes a transport layer security channel between the terminal device and the interface adaptation function entity.

In this design, the terminal device and the interface adaptation function entity can perform communication interaction through the transport layer security channel, to ensure communication security.

In a possible design, the certificate is a registration certificate or an anonymous certificate.

According to a second aspect, an embodiment of this application provides a certificate application method, applied to a certificate management architecture shown in FIG. 2. The certificate management architecture includes terminal devices, an interface adaptation function entity set with an interface for interacting with at least one certificate management function entity, and certificate management function entities. The method includes: The interface adaptation function entity receives a certificate application parameter of the terminal device. Then, the interface adaptation function entity determines a target certificate management function entity that configures a certificate for the terminal device, and sends the certificate application parameter to the target certificate management function entity, so that the target certificate management function entity configures the certificate for the terminal device based on the certificate application parameter. Finally, the interface adaptation function entity receives the certificate from the target certificate management function entity through a target interface, and sends the certificate to the terminal device.

In this method, the interface adaptation function entity can apply for the certificate from the target certificate management function entity for the terminal device based on the certificate application parameter sent by the terminal device. The interface adaptation function entity can shield implementation or deployment of the certificate management function entity from the terminal device, so that the terminal device can be unaware of the certificate management function entity at an upper layer. Therefore, the terminal device does not need to locally set an interface for interacting with the certificate management function entity. This method can reduce, on the basis of ensuring that the terminal device can interact with different certificate management function entities, a quantity of interfaces inside the terminal device for interacting with the certificate management function entities.

In a possible design, the target interface for interacting with the target certificate management function entity is set in the interface adaptation function entity. In this scenario, the interface adaptation function entity sends the certificate application parameter to the target certificate management function entity through the target interface. The interface adaptation function entity receives the certificate from the target certificate management function entity through the target interface.

In a possible design, the interface adaptation function entity sends the certificate application parameter to the target certificate management function entity through the target interface in the following steps:

The interface adaptation function entity generates, based on the target interface, a certificate request message including the certificate application parameter, and sends the certificate request message to the terminal device. The interface adaptation function entity receives the certificate request message obtained after signature processing front the terminal device, and sends the certificate request message obtained after signature processing to the target certificate management function entity through the target interface.

In this design, the interface adaptation function entity can first send the generated certificate request message to the terminal device for signature processing, and then send the certificate request message obtained after signature processing to the target management function entity. In this way, after the certificate request message is transmitted to the target certificate management function entity, the target certificate management function entity can verify, based on the signature, that the certificate request message is sent by the terminal device and is authentic and valid.

In a possible design, the interface adaptation function entity receives a certificate response message front the target certificate management function entity, and sends the certificate response message to the terminal device, where the certificate response message includes the certificate configured by the target certificate management function entity for the terminal device. In this design, the interface adaptation function entity can receive the certificate from the target certificate management function entity. Optionally, the certificate response message may be sent after the target certificate management function entity performs signature processing on the certificate response message. In this way, after the terminal device receives the certificate response message obtained after signature processing, the terminal device can prove, based on the signature, that the certificate response message is sent by the target certificate management function entity and is authentic and valid.

In a possible design, the interface adaptation function entity may determine, in the following manners, the target certificate management function entity that configures the certificate for the terminal device:

Manner 1: The interface adaptation function entity receives information about the target certificate management function entity front the terminal device, and determines the target certificate management function entity based on the information about the target certificate management function entity.

Manner 2: The interface adaptation function entity determines an identifier of the terminal device, and determines, based on a locally stored correspondence between the identifier of the terminal device and information about a certificate management function entity, information about the target certificate management function entity corresponding to the identifier of the terminal device, and the interface adaptation function entity determines the target certificate management function entity based on the information about the target certificate management function entity.

In this design, the interface adaptation function entity can determine the target certificate management function entity.

In a possible design, after the interface adaptation function entity receives the information about the target certificate management function entity from the terminal device, the interface adaptation function entity determines that there is a locally set target interface for interacting with the target certificate management function entity, and sends a notification message to the terminal device, where the notification message is used to notify the terminal device that the target interface for interacting with the target certificate management function entity is set in the interface adaptation function entity.

In this design, the interface adaptation function entity can notify the terminal device that there is the locally set target interface, where the target interface can be used to apply for the certificate for the terminal device, or can notify the terminal device to send the certificate application parameter.

In a possible design, the notification message includes a root certificate of the target certificate management function entity. In this way, after the terminal device receives the certificate, the terminal device can verify the received certificate based on the root certificate, to verify security of the certificate.

In a possible design, before the interface adaptation function entity receives the information about the target certificate management function entity from the terminal device, the interface adaptation function entity sends information about at least one certificate management function entity to the terminal device, where the at least one certificate management function entity includes the target certificate management function entity, and an interface for interacting with the at least one certificate management function entity is set in the interface adaptation function entity.

In this design, the interface adaptation function entity can notify the terminal device of the at least one certificate management function entity with which the interface adaptation function entity can interact, so that the terminal device can select, from the at least one certificate management function entity, the target certificate management function entity from which the certificate is applied for.

In a possible design, before the interface adaptation function entity receives the certificate application parameter of the terminal device, the interface adaptation function entity establishes a transport layer security channel between the interface adaptation function entity and the terminal device. In this design, the terminal device and the interface adaptation function entity can perform communication interaction through the transport layer security channel, to ensure communication security.

In a possible design, before the interface adaptation function entity sends the certificate application parameter to the target certificate management function entity, the interface adaptation function entity establishes a transport layer security channel between the interface adaptation function entity and the target certificate management function entity. In this design, the interface adaptation function entity and the target certificate management function entity can perform communication interaction through the transport layer security channel, to ensure communication security.

In a possible design, the certificate is a registration certificate or an anonymous certificate.

According to a third aspect, an embodiment of this application provides a certificate application method, applied to a certificate management architecture shown in FIG. 2. The certificate management architecture includes terminal devices, an interface adaptation function entity set with an interface for interacting with at least one certificate management function entity, and certificate management function entities. The method includes: A target certificate management function entity receives a certificate application parameter of the terminal device from the interface adaptation function entity. Then, the target certificate management function entity configures a certificate for the terminal device based on the certificate application parameter. Finally, the target certificate management function entity sends the certificate to the interface adaptation function entity.

In this method, the interface adaptation function entity can apply for the certificate from the target certificate management function entity for the terminal device based on the certificate application parameter sent by the terminal device. The interface adaptation function entity can shield implementation or deployment of the certificate management function entity from the terminal device, so that the terminal device can be unaware of the certificate management function entity at an upper layer. Therefore, the terminal device does not need to locally set an interface for interacting with the certificate management function entity. This method can reduce, on the basis of ensuring that the terminal device can interact with different certificate management function entities, a quantity of interfaces inside the terminal device for interacting with the certificate management function entities.

In a possible design, the target certificate management function entity may receive the certificate application parameter of the terminal device from the interface adaptation function entity in the following manner: The target certificate management function entity receives from the interface adaptation function entity, a certificate request message on which the terminal device performs signature processing, where the certificate request message includes the certificate application parameter. In this scenario, before the target certificate management function entity configures the certificate for the terminal device, the target certificate management function entity needs to perform signature verification on the certificate request message obtained after signature processing, where the verification succeeds. In this design, the target certificate management function entity can determine, through signature verification, that the certificate request message is sent by the terminal device and is authentic and valid.

In a possible design, the target certificate management function entity sends a certificate response message to the interface adaptation function entity, where the certificate response message includes the certificate. In this design, the target certificate management function entity can finally send the certificate to the terminal device by using the interface adaptation function entity. Optionally, the certificate response message may be sent after the target certificate management function entity performs signature processing on the certificate response message. In this way, after the terminal device receives the certificate response message obtained after signature processing, the terminal device can prove, based on the signature, that the certificate response message is sent by the target certificate management function entity and is authentic and valid.

In a possible design, before the target certificate management function entity receives the certificate application parameter of the terminal device from the interface adaptation function entity, the target certificate management function entity establishes a transport layer security channel between the target certificate management function entity and the interface adaptation function entity. In this design, the interface adaptation function entity and the target certificate management function entity can perform communication interaction through the transport layer security channel, to ensure communication security.

In a possible design, the certificate is a registration certificate or an anonymous certificate.

According to a fourth aspect, an embodiment of this application provides a communications apparatus, including a unit configured to perform the step in any one of the foregoing aspects.

According to a fifth aspect, an embodiment of this application provides a terminal device, including at least one processing element and at least one storage element. The at least one storage element is configured to store a program and data, and the at least one processing element is configured to perform the method provided in the first aspect of this application.

According to a sixth aspect, an embodiment of this application provides a communications device, including at least one processing element and at least one storage element. The at least one storage element is configured to store a program and data, and the at least one processing element is configured to perform the method provided in the second aspect or the third aspect of this application.

According to a seventh aspect, an embodiment of this application provides a communications system, including a terminal device, an interface adaptation function entity, and a certificate management function entity. The terminal device has a function of performing the method provided in the first aspect of this application. The interface adaptation function entity has a function of performing the method provided in the second aspect of this application. The certificate management function entity has a function of performing the method provided in the third aspect of this application.

According to an eighth aspect, an embodiment of this application further provides a computer program. When the computer program is run on a computer, the computer is enabled to perform the method in any one of the foregoing aspects.

According to a ninth aspect, an embodiment of this application further provides a computer-readable storage medium. The computer-readable storage medium store a computer program, and when the computer program is executed by a computer, the computer is enabled to perform the method in any one of the foregoing aspects.

According to a tenth aspect, an embodiment of this application further provides a chip. The chip is configured to read a computer program stored in a memory, to perform the method in any one of the foregoing aspects.

According to an eleventh aspect, an embodiment of this application further provides a chip system. The chip system includes a processor, configured to support a computer apparatus in implementing the method provided in any one of the foregoing aspects. In a possible design, the chip system further includes a memory, and the memory is configured to store a program and data that are used for the computer apparatus. The chip system may include a chip, or may include a chip and another discrete device.

DESCRIPTION OF EMBODIMENTS

Figure 1A:
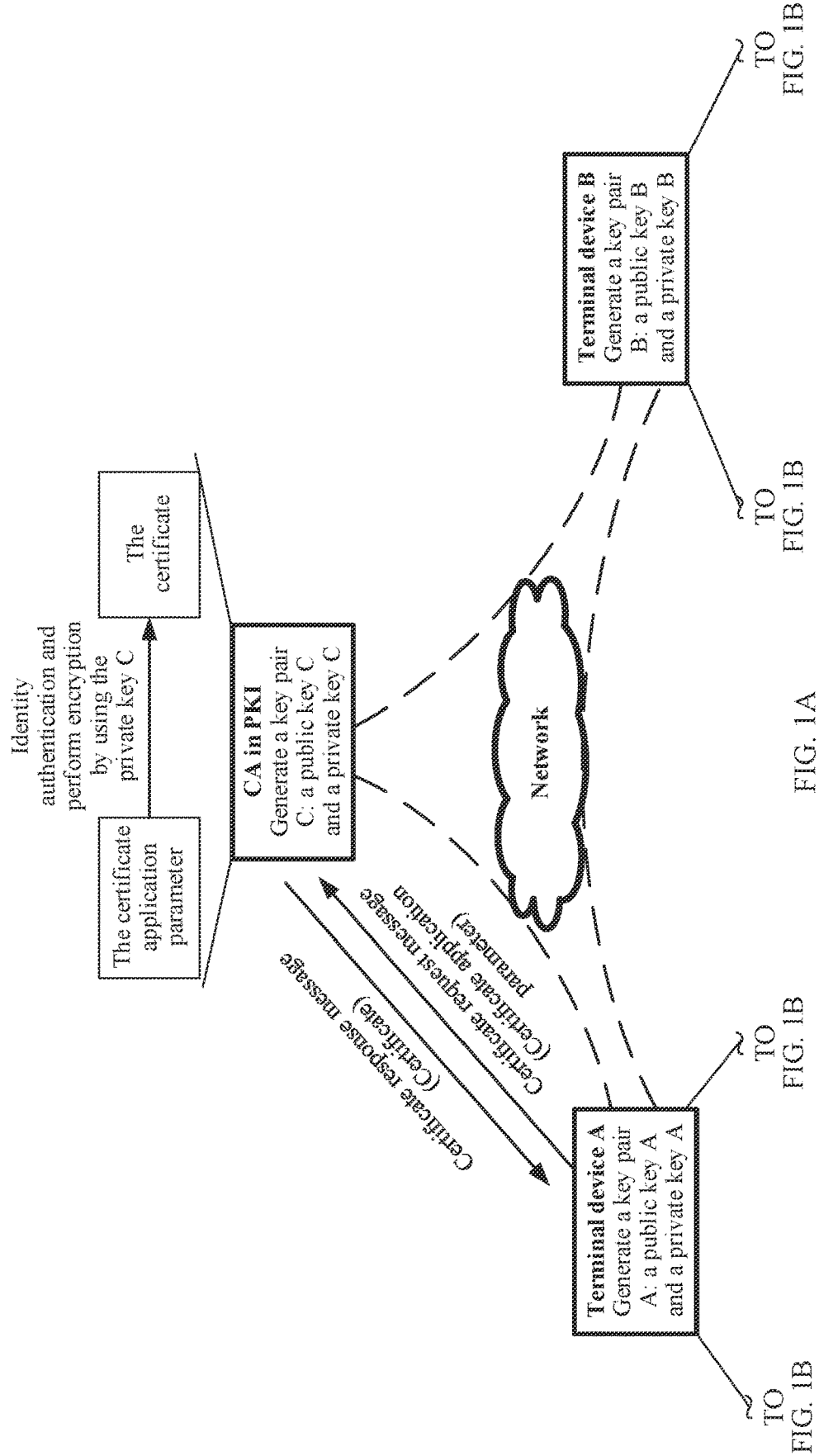
FIG. 1A and FIG. 1B are a certificate application procedure and a data transmission process in the conventional technology.

This application provides a certificate application method and a device, to reduce, on the basis of ensuring that a terminal device can interact with different certificate management function entities, a quantity of interfaces inside the terminal device for interacting with the certificate management function entities. The method and the device are based on a same inventive concept. Because a problem-resolving principle of the method is similar to a problem-resolving principle of the device, mutual reference may be made to implementations of the method and the device, and no repeated description is provided.

In the solutions provided in embodiments of this application, an interface adaptation function entity can interact with the certificate management function entity that configures a certificate for the terminal device. When the terminal device needs to apply for the certificate, the terminal device can send a certificate application parameter of the terminal device to the interface adaptation function entity, so that the interface adaptation function entity can apply for the certificate from the certificate management function entity for the terminal device based on the certificate application parameter, and send the certificate to the terminal device after the certificate is applied for successfully. In the solutions, the interface adaptation function entity can shield implementation or deployment of the certificate management function entity from the terminal device, so that the terminal device can be unaware of the certificate management function entity at an upper layer. Therefore, the terminal device does not need to locally set an interface for interacting with the certificate management function entity. This method can reduce, on the basis of ensuring that the terminal device can interact with the different certificate management function entities, a quantity of interfaces inside the terminal device for interacting with the certificate management function entities.

Some terms in this application are described below, so as to help a person skilled in the art have a better understanding.

(1) Terminal device: A terminal device is a device that provides voice and/or data connectivity for a user. The terminal device may also be referred to as user equipment (UE), a mobile station (MS), a mobile terminal (MT), or the like.

For example, the terminal device may be a hand-held device or a vehicle-mounted device that has a wireless connection function. Currently, some examples of the terminal device are as follows: a mobile phone, a tablet computer, a notebook computer, a palmtop computer, a mobile interact device (MID), a smart sales terminal (point of sale, POS), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, various intelligent instruments (a smart water meter, a smart meter, and a smart gas meter), a smart automobile, an on board unit (OBU), a road side unit (RSU), road side equipment (RSE), and the like in the internet of vehicles.

(2) Certificate management function entity: A certificate management function entity is an entity that can perform identity authentication on a terminal device and configure a certificate for the terminal device. For example, the certificate management function entity may be a PKI or a CA.

(3) Interface adaptation function entity: An interface adaptation function entity is an intermediate layer between a terminal device and a certificate management function entity, and is an interface adaptation platform between the terminal device and the certificate management function entity. An interface for interacting with at least one certificate management function entity is set in the interface adaptation function entity. Therefore, the interface adaptation function entity can interact with the corresponding certificate management function entity through the interface, and apply for a certificate for the terminal device.

It should be noted that, the interface adaptation function entity may be a single independent device, may be a set of function-coupled devices, or may be integrated into a device having another function. For example, the interface adaptation function entity may be a server or a network device.

(4) Key pair: In an asymmetric encryption algorithm, there are two types of keys: a private key and a public key. The private key and the public key are a key pair. The private key is held by a key pair generator and cannot be disclosed to the public. The public key is disclosed to another device by the key pair generator. The two keys in the key pair each are used by a sender and a receiver to encrypt and decrypt transmitted content.

(5) Signature of a message: Signature of a message is obtained when a sender of the message obtains a digest of the to-be-transmitted message, and then encrypts the digest by using a private key in a key pair generated by the sender.

For example, the sender of the message may obtain the digest from the to-be-transmitted message by using a preset hash algorithm. Optionally, the hash algorithm may be a secure hash algorithm (SHA).

(6) Signature verification: Signature verification is used by a receiver of a message to verify integrity of the message. A specific signature verification process is as follows: After receiving the message to which signature is added, the receiver of the message obtains a digest 1 from the obtained message. Then, the receiver decrypts the signature of the message by using a public key of a sender to obtain a digest 2. Finally, the receiver compares the digest 1 with the digest 2. If the two digests are totally the same, it is determined that the signature verification succeeds, and it is indicated that the received message is complete, authentic, reliable, and not tampered with. If the two digests are different, it is determined that the signature verification fails, and it is indicated that the received message is incomplete and insecure.

(7) Certificate application parameter: A certificate application parameter is sent by a terminal device that applies for a certificate to a certificate management function entity. The certificate application parameter includes a public key of the terminal device. Optionally, the certificate application parameter may further include other information such as an identifier of the terminal device.

(8) A plurality of: "A plurality of" means two or more than two.

(9) At least one: "At least one" means one or more.

(10) And/Or: "And/Or" describes an association relationship between associated objects and represents that three relationships may exist. For example, A and/or B may represent the following three cases: Only A exists, both A and B exist, and only B exists. The character "/" generally indicates an "or" relationship between the associated objects.

In addition, it should be understood that in the description of this application, terms such as "first" and "second" are merely used for distinguishing and description, but should not be understood as indicating or implying relative importance, or should not be understood as indicating or implying a sequence.

Figure 1B:
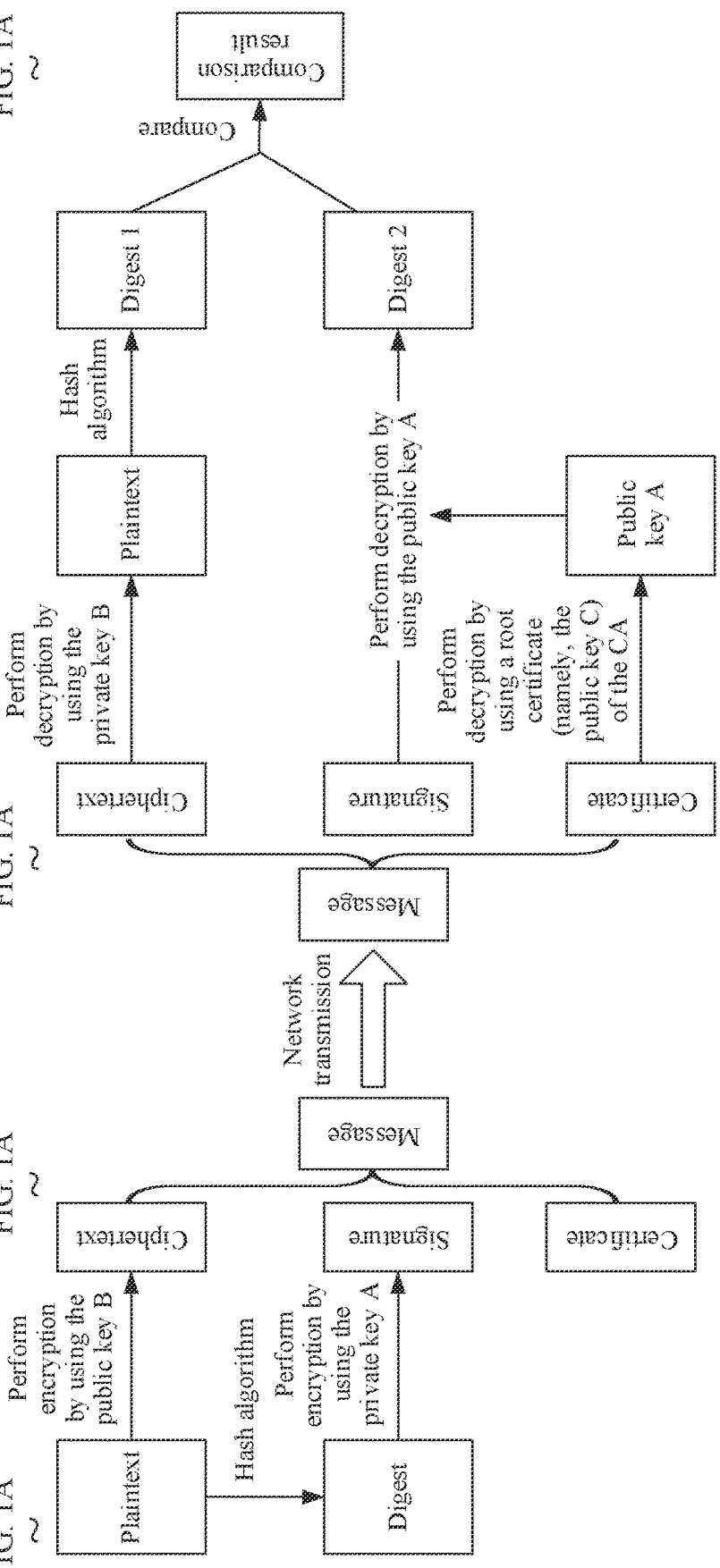

The following uses a data transmission process shown in FIG. 1A and FIG. 1B as an example to describe a process of transmitting data in a manner of combining an encryption algorithm with a certificate mechanism in a communications system.

A conventional data security communications network includes a plurality of terminal devices and a certificate management function entity (a CA in a PKI is used as an example below). The devices communicate with each other over the network, as shown by a dashed line in FIG. 1A and FIG. 1B. After entering the communications network and before performing data transmission, any terminal device needs to apply for a registration certificate from the CA in the PKI, and then perform secure data transmission based on the applied registration certificate.

The following describes a conventional certificate application procedure by using an example in which a terminal device A applies for a registration certificate.

When starting to execute a service, the terminal device A determines the target CA corresponding to the service. Then, the terminal device A sends a certificate request message to the target CA in the PKI, where the certificate request information includes a certificate application parameter of the terminal device A: a public key A in a key pair A generated by the terminal device A (optionally, the parameter may further include other information such as an identifier (namely, identity information) of the terminal device A). After receiving the certificate request message from the terminal device A, the target CA in the PKI performs identity authentication on the terminal device A. After authenticating the identity of the terminal device A, the target CA encrypts the public key A and other related information (for example, including the identifier of the terminal device A) by using a private key C in a key pair C in the target CA, to generate the registration certificate of the terminal device A. Then, the target CA sends the registration certificate of the terminal device A to the terminal device A by using a certificate response message, to complete the certificate application/initial registration process for the terminal device A.

For example, the target CA may, but is not limited to, perform identity authentication on the terminal device A in the following manners: Manner 1: The target CA performs identity authentication on the terminal device A based on the identifier of the terminal device A in the certificate application parameter of the terminal device A. Manner 2: The target CA may complete identity authentication on the terminal device A by using a conventional identity authentication procedure. For example, the target CA sends an identity authentication request message to the terminal device A. After receiving an identity authentication response message from the terminal device A, the target CA may complete identity authentication on the terminal device A based on the identity authentication response message.

It should be noted that, after applying for the registration certificate from the target CA, the terminal device A may further apply for an anonymous certificate from the target CA. A process in which the terminal device A applies for the anonymous certificate is similar to the process of applying for the registration certificate. A difference lies in that the target CA may not perform identity authentication on an applicant (the terminal device) after receiving a certificate request message.

A process in which the terminal device A transmits data to a terminal device B is as follows:

When sending the data to the terminal device B (for ease of comparison with ciphertext, plaintext is short for the data below), the terminal device A needs to obtain a digest from the plaintext by using a preset hash algorithm, and then encrypts the digest into signature by using a private key A in the key pair A of the terminal device A. In addition, the terminal device A encrypts the plaintext into ciphertext by using a locally stored public key B of the terminal device B. Finally, the terminal device A sends, to the terminal device B over the network, a message carrying the ciphertext, the signature, and the certificate applied for by the terminal device A. A process in which the terminal device A determines the signature for the to-be-sent plaintext, and includes the signature and the ciphertext obtained after the plaintext is encrypted in the same message for sending is referred to as a process in which the terminal device A performs signature processing on the plaintext.

After receiving the message sent by the terminal device A, the terminal device B obtains the ciphertext, the signature, and the certificate in the message. Then, the terminal device B decrypts the ciphertext into the plaintext by using a private key B in a key pair B of the terminal device B, and performs signature verification in the following steps, to ensure integrity of the data and that the data is not tampered with:

(1) The terminal device B obtains a digest 1 from the plaintext by using a preset hash algorithm (same as the hash algorithm used by the terminal device A).

(2) The terminal device B decrypts the obtained certificate based on an obtained root certificate of the CA (namely, a public key C in the key pair of the CA), to obtain the public key A of the terminal device A. The terminal device B may obtain the root certificate of the CA in manners. For example, the terminal device B may request the root certificate of the CA from the CA, the terminal device B obtains the root certificate of the CA when installing an application released by the CA, or the terminal device B obtains the root certificate of the CA from the message sent by the terminal device A.

(3) The terminal device B decrypts the obtained signature by using the public key A of the terminal device A, to obtain a digest 2 in the signature.

(4) The terminal device B compares the digest 2 obtained through decryption with the digest 1 obtained from the plaintext. When the two digests are totally the same, the terminal device B determines that the signature verification succeeds, and the obtained plaintext is complete and not tampered with. When the two digests are different, the terminal device B determines that the signature verification fails, and the obtained plaintext is unreliable.

In the conventional certificate application method described above, the terminal device implements communication interaction with the target CA through an interface set inside the terminal device for interacting with the target CA. Different services may correspond to different CAs, different CAs are deployed by different construction institutions, and different construction institutions may deploy the CAs by using different communications technologies. Therefore, different CAs perform interaction with terminal devices through different interfaces. Therefore, if the terminal device still uses the conventional certificate application method, interfaces for interacting with CAs corresponding to a plurality of services need to be set inside the terminal device, to ensure that the services of the terminal device are implemented diversely. This reduces idle storage space of the terminal device, increases development costs, and prolongs a development period of the terminal device.

To resolve the foregoing problems, this application provides a certificate application method and a device. The following describes the embodiments of this application in detail with reference to the accompanying drawings.

Figure 2:
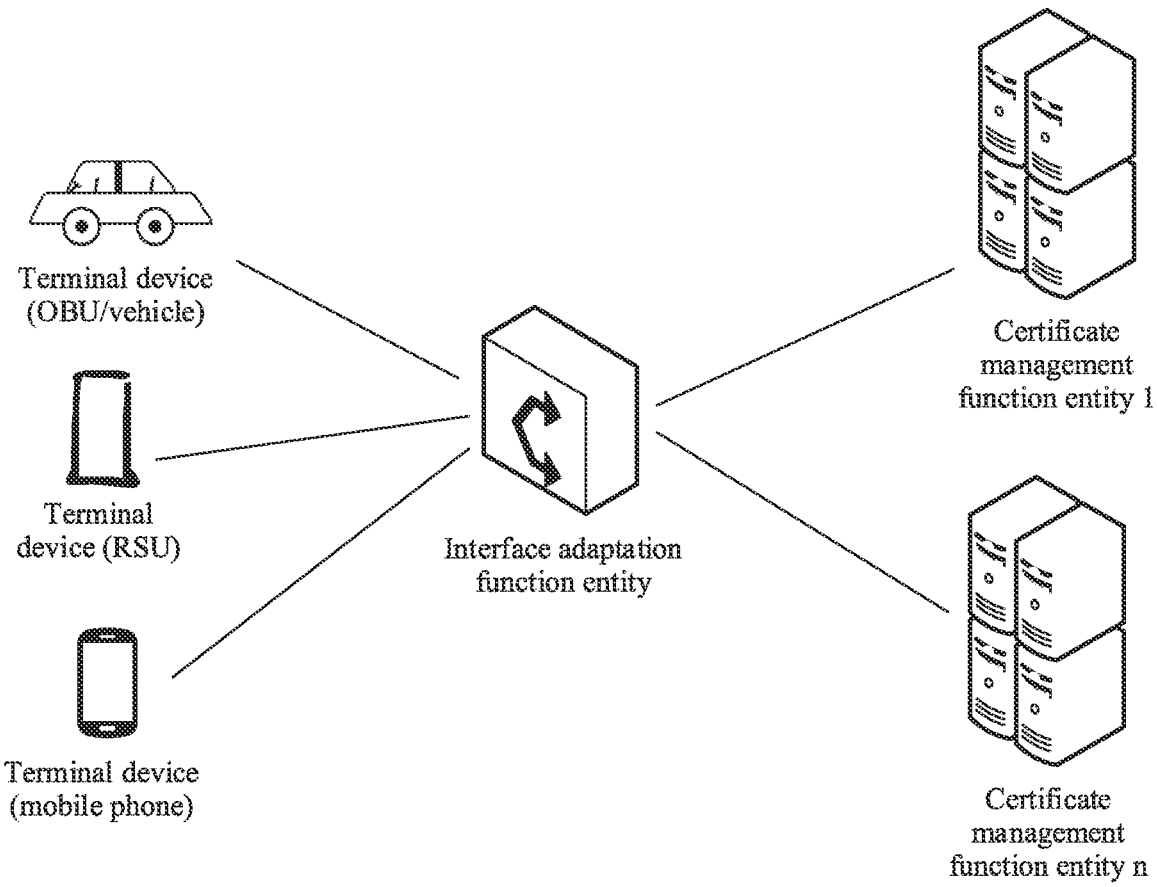
FIG. 2 is a schematic diagram of a certificate management architecture according to an embodiment of this application.

FIG. 2 shows a certificate management architecture to which a certificate application method in an embodiment of this application is applied. The architecture includes terminal devices, an interface adaptation function entity, at least one certificate management function entity, and the like. The following first describes functions of each device in the architecture.

The terminal device is a device that performs a service to provide a corresponding service for a user. Representation forms of the terminal device vary in different application scenarios. For example, the terminal device may be a vehicle, an OBU, an RSU, an RSE, or the like in a V2X communication scenario. The terminal device may be a mobile phone, a tablet computer, or the like in a conventional mobile communication scenario. The terminal device may be a mobile interact device, a wearable device, or various wireless terminals in an industry or a home in an interact of things (IoT) communication scenario.

The interface adaptation function entity, also referred to as an interface adaptation device, is an intermediate layer between the terminal device and the certificate management function entity, and is an interface adaptation platform between the terminal device and the certificate management function entity. An interface for interacting with the at least one certificate management function entity is set in the interface adaptation function entity. Therefore, the interface adaptation function entity may interact with corresponding certificate management function entities through interfaces inside the interface adaptation function entity, to apply for certificates for the terminal device.

The interface adaptation function entity may be an independent device, may be a set of function-coupled devices, or may be integrated into a device having another function. For example, the interface adaptation function entity may be a server deployed on a cloud platform, or may be a conventional server or a network device.

In some implementations, a specific interface for interacting with the interface adaptation function entity may be set inside the terminal device, so that the terminal device may perform communication interaction with the interface adaptation function entity through the interface. Therefore, the terminal device may apply for certificates from a plurality of certificate management function entities through interaction with the interface in the interface adaptation function entity.

In some other implementations, the terminal device may perform a function with the interface adaptation function entity without setting a special interface inside the terminal device.

The certificate management function entity is responsible for certificate management of the terminal device, for example, certificate configuration, update, deregistration, and verification. Specifically, in this embodiment of this application, the certificate management function entity is an entity that can perform identity authentication on the terminal device, and configure a certificate (including a registration certificate and an anonymous certificate) for the terminal device. For example, the certificate management function entity may be a PKI or a CA.

In some implementations, an interface for interacting with the at least one certificate management function entity may be further set inside the terminal device. In this way, when the terminal device needs to apply for a certificate from the at least one certificate management function entity, the terminal device can directly perform communication interaction with the at least one certificate management function entity through the local interface. When the terminal device needs to apply for a certificate from another certificate management function entity, the interface adaptation function entity may be used.

In the architecture provided in this application, the interface through which the terminal device or the interface adaptation function entity interacts with the certificate management function entity is not a conventional physical interface, but is a group of communication configuration or communications protocols stored in the device. The interface is a set of conventions that both communication parties need to comply with. The interface may include, but is not limited to, a manner of establishing a connection to the certificate management function entity, a manner of recognizing both the communication parties, and a message format, a transmission manner, an interaction procedure, and the like in a communication interaction process.

It should be noted that, in the architecture provided in this application, the terminal device may establish a communication connection to the interface adaptation function entity over a mobile communications network (including an access network and a core network), to perform communication interaction. The interface adaptation function entity may establish a communication connection to each certificate management function entity over a conventional IP network, to perform communication interaction.

In addition, the architecture shown in FIG. 2 may be applied to a plurality of communication scenarios, for example, a 5th generation (5G) communications system, a future 6th generation communications system and evolved other communications system, a long term evolution (LTE) communications system, vehicle to everything (V2X), long term evolution-internet of vehicles (LTE-V), vehicle to vehicle (V2V), internet of vehicles, machine type communications (MTC), internet of things (IoT), long term evolution-machine to machine (LTE-M), and machine to machine (M2M).

An embodiment of this application provides a certificate application method, to reduce, on the basis of ensuring that a terminal device can interact with different certificate management function entities, a quantity of interfaces inside the terminal device for interacting with the certificate management function entities. The following describes in detail the certificate application method provided in this embodiment of this application with reference to a flowchart shown in FIG. 3.

S301: When starting to execute a service, the terminal device sends a certificate application parameter to an interface adaptation function entity, to ensure security of data transmission of the service. Correspondingly, the interface adaptation function entity receives the certificate application parameter from the terminal device. The certificate application parameter includes a public key of the terminal device, and may further include an identifier of the terminal device used to indicate an identity of the terminal device. In this embodiment of this application, a message about the certificate application parameter sent by the terminal device may be referred to as a first message.

Optionally, the identifier of the terminal device may be a device identifier of the terminal device, an IP address of the terminal device, or a user identifier of a user using the terminal device, or may be other information that can uniquely identify the terminal device.

The public key of the terminal device is a public key in a key pair generated by the terminal device. The public key of the terminal device is used to decrypt signature in a subsequent process in which the terminal device transmits data, and in a process in which another device that receives a message on which the terminal device performs signature processing performs signature authentication on the message.

S302: The interface adaptation function entity determines a target certificate management function entity that configures a certificate for the terminal device.

A target interface for interacting with the target certificate management function entity is set in the interface adaptation function entity.

In this embodiment of this application, the interface adaptation function entity may determine the target certificate management function entity in but not limited to the following implementations:

In a first implementation, the terminal device determines the target certificate management function entity, and sends information about the target certificate management function entity to the interface adaptation function entity. Then, the interface adaptation function entity may obtain the information about the target certificate management function entity from the terminal device, and determine the target certificate management function entity based on the information about the target certificate management function entity.

In the first implementation, the terminal device may determine the target certificate management function entity in but not limited to the following manners:

Manner 1: The terminal device may determine, based on the service that is started to be executed, the target certificate management function entity corresponding to the service.

Manner 2: The interface adaptation function entity sends information about at least one certificate management function entity to the terminal device, where the information about the at least one certificate management function entity includes the information about the target certificate management function entity, and an interface for interacting with the at least one certificate management function entity is set in the interface adaptation function entity. After receiving the information about the at least one certificate management function entity from the interface adaptation function entity, the terminal device may select the target certificate management function entity from the at least one certificate management function entity. In this embodiment of this application, a message about the information about the at least one certificate management function entity sent by the interface adaptation function entity may be referred to as a second message.

Optionally, when the interface adaptation function entity sends the information about the at least one certificate management function entity to the terminal device, the interface adaptation function entity may further send a root certificate of the at least one certificate management function entity to the terminal device. In this way, after applying for a certificate from any one of the at least one certificate management function entity by using the interface adaptation function entity, the terminal device may verify the applied certificate based on a root certificate of the certificate management function entity.

Optionally, the interface adaptation function entity may send the second message to the terminal device in a process of establishing a communication connection to the terminal device or after establishing a communication connection.

The communication connection between the terminal device and the interface adaptation function entity may be a transport layer security (TLS) channel. If the interface adaptation function entity sends the second message in a process of establishing the TLS channel between the interface adaptation function entity and the terminal device, the second message may be a server_hello message, a certificate message, a server_key_exchange message, a certificate_request message, a server_hello_done message, a change_cipher_spec message, or a finished message that is sent by the interface adaptation function entity to the terminal device.

In addition, in this embodiment of this application, communication interaction between the terminal device and the interface adaptation function entity is implemented through the communication connection.

In the first implementation, after determining the target certificate management function entity, the terminal device may send the information about the target certificate management function entity to the interface adaptation function entity in the following manners: In this embodiment of this application, a message about the information about the target certificate management function entity sent by the terminal device may be referred to as a third message.

Manner 1: The terminal device may send the third message to the interface adaptation function entity before performing S301.

Optionally, the terminal device may send the information about the target certificate management function entity to the interface adaptation function entity in the process of establishing the communication connection to the interface adaptation function entity or after establishing the communication connection.

When the communication connection between the terminal device and the interface adaptation function entity is the MS channel, when the terminal device sends the third message to the interface adaptation function entity when establishing the MS channel, the third message may be a client_hello message, a certificate message, a client_key_exchange message, a certificate_verify message, a change_cipher_spec message, a finished message, or the like that is sent by the terminal device after receiving the second message.

Manner 2: The terminal device may send the information about the target certificate management function entity to the interface adaptation function entity in performing S301. That is, the first message includes the third message, or the first message and the third message are a same message. In this manner, the first message not only includes the certificate application parameter, but also includes the information about the target certificate management function entity.

Manner 3: The terminal device may send the third message to the interface adaptation function entity after performing S301.

In a first implementation, when the terminal device determines the target certificate management function entity in Manner 1, after receiving the information about the target certificate management function entity sent by the terminal device, and determining that there is a locally set target interface for interacting with the target certificate management function entity, the interface adaptation function entity sends a notification message to the terminal device. The notification message is used to notify the terminal device that the target interface for interacting with the target certificate management function entity is set in the interface adaptation function entity.

Optionally, the notification message may further include information such as a root certificate of the target certificate management function entity, a certificate of an ECA in the target certificate management function entity, and an address of the target certificate management function entity. The root certificate of the target certificate management function entity may be used to verify the certificate after the terminal device receives the certificate.

In a second implementation, the interface adaptation function entity independently determines the target certificate management function entity that configures the certificate for the terminal device. Specifically, the interface adaptation function entity obtains the identifier of the terminal device, may determine, based on a locally stored correspondence between the identifier of the terminal device and information about a certificate management function entity, information about the target certificate management function entity corresponding to the identifier of the terminal device, and then determines the target certificate management function entity based on the information about the target certificate management function entity. The interface adaptation function entity may obtain the identifier of the terminal device from the certificate application parameter, or obtain the identifier of the terminal device from the first message including the certificate application parameter.

S303: The interface adaptation function entity sends the certificate application parameter to the target certificate management function entity through the target interface, so that the target certificate management function entity configures the certificate for the terminal device. The target certificate management function entity obtains the certificate application parameter of the terminal device from the interface adaptation function entity.

In this embodiment of this application, the interface adaptation function entity may perform S303 in a plurality of implementations.

In a first implementation, the interface adaptation function entity generates, based on the target interface, a fourth message including the certificate application parameter, and sends the fourth message to the target certificate management function entity.

Correspondingly, the target certificate management function entity may receive, from the interface adaptation function entity, the fourth message including the certificate application parameter, and obtain the certificate application parameter of the terminal device in the fourth message.

In the first implementation, the interface adaptation function entity can quickly transmit the certificate application parameter of the terminal device to the target certificate management function entity, so that a transmission delay of the certificate application parameter can be reduced as much as possible.

A second implementation specifically includes the following steps:

A. The interface adaptation function entity generates, based on the target interface, a fourth message including the certificate application parameter.

B. The interface adaptation function entity sends the fourth message to the terminal device, so that the terminal device performs signature processing on the fourth message, to prove that the fourth message is sent by the terminal device for requesting the certificate and is not forged by another device.

C. After receiving the fourth message from the interface adaptation function entity, the terminal device performs signature processing on the fourth message, and then sends the fourth message obtained after signature processing to the interface adaptation function entity.

D. The interface adaptation function entity receives the fourth message obtained after signature processing from the terminal device, and sends the fourth message obtained after signature processing to the target certificate management function entity through the target interface.

Correspondingly, the target certificate management function entity may receive the fourth message obtained after signature processing from the interface adaptation function entity, then perform signature verification on the fourth message obtained after signature processing, where the verification succeeds.

A process in which the target certificate management function entity performs signature verification varies based on a process in which the terminal device performs signature processing on the fourth message, for example, in the following solutions:

Solution 1: In step C, that the terminal device performs signature processing on the fourth message includes: The terminal device first obtains a digest of the fourth message by using a preset hash algorithm, then encrypts the digest by using a private key in a key pair of the terminal device to obtain signature of the fourth message, and finally adds the signature to the fourth message, to obtain the fourth message obtained after signature processing.

In this case, after receiving the fourth message obtained after signature processing, the target certificate management function entity may obtain the public key of the terminal device from the fourth message, and then decrypt the signature of the fourth message by using the public key of the terminal device, to obtain a digest a. Then, the target certificate management function entity obtains a digest b of the fourth message by using a preset hash algorithm (the same as the hash algorithm used by the terminal device). When determining that the digest a and the digest b are totally the same, the target certificate management function entity determines that signature verification succeeds.

Solution 2: In step C, that the terminal device performs signature processing on the fourth message includes: The terminal device first obtains a digest of the fourth message by using a preset hash algorithm, then encrypt the digest by using a device certificate negotiated or preset by the terminal device and the target certificate management function entity to obtain signature of the fourth message, and finally adds the signature to the fourth message, to obtain the fourth message obtained after signature processing.

In this case, after receiving the fourth message obtained after signature processing, the target certificate management function entity may decrypt the signature of the fourth message by using the root certificate corresponding to the device certificate, to obtain a digest a. Then, the target certificate management function entity obtains a digest b of the fourth message by using a preset hash algorithm (the same as the hash algorithm used by the terminal device). When determining that the digest a and the digest b are totally the same, the target certificate management function entity determines that signature verification succeeds.

In a second implementation, the interface adaptation function entity can perform signature processing on the fourth message by using the terminal device, so that after the fourth message is transmitted to the target certificate management function entity, the target certificate management function entity can prove, based on the signature, that the fourth message is sent by the terminal device, and is authentic and valid.

It should be further noted that, in the foregoing two implementations, the fourth message may be a conventional certificate request message, or may be another message. This is not limited in this application.

In addition, in the foregoing two implementations, a format of the fourth message generated based on the target interface complies with a message format specification of the target interface. Therefore, the interface adaptation function entity can subsequently successfully send the fourth message to the target certificate management function entity through the target interface.

It should be noted that the interface adaptation function entity performs communication interaction with the target certificate management function entity through a communication connection between the interface adaptation function entity and the target certificate management function entity. Optionally, the communication connection may alternatively be a TLS channel. This is not limited in this application.

S304: The target certificate management function entity configures the certificate for the terminal device based on the certificate application parameter.

In this step, the target certificate management function entity may configure the certificate by using a conventional method.

For example, the target certificate management function entity may configure a registration certificate by using the following steps: The target certificate management function entity first performs identity authentication on the terminal device. After authenticating the identity of the terminal device, the target certificate management function entity encrypts information including the public key of the terminal device by using a private key of the target certificate management function entity, to generate the certificate. For a specific identity authentication process and a certificate configuration process, refer to the description of the conventional certificate application process in FIG. 1A and FIG. 1B Details are not described herein again.

In addition, for a process in which the target certificate management function entity configures an anonymous certificate, refer to the foregoing description. A difference lies in that, the target certificate management function entity may not perform identity authentication on the terminal device.

S305: The target certificate management function entity sends the certificate to the interface adaptation function entity. The interface adaptation function entity receives the certificate from the target certificate management function entity through the target interface. In this embodiment of this application, a message about the certificate sent by the target certificate management function entity to the interface adaptation function entity may be referred to as a fifth message.

In an implementation, the target certificate management function entity may send the fifth message to the interface adaptation function entity.

In another implementation, to ensure that the fifth message is sent by the target certificate management function entity, the target certificate management function entity first performs signature processing on the fifth message before sending the fifth message. A specific process includes: The target certificate management function entity first obtains a digest of the fifth message by using the preset hash algorithm; encrypts the digest by using the private key of the target certificate management function entity to obtain signature of the fifth message; and finally adds the signature to the fifth message to obtain the fifth message obtained after signature processing.

The fifth message may be a conventional certificate response message, or may be another message. This is not limited in this application.

S306: The interface adaptation function entity sends the certificate to the terminal device. The terminal device receives the certificate from the interface adaptation function entity. It can be learned from the description of S305 that the message about the certificate sent by the interface adaptation function entity to the terminal device may be the fifth message, or may be the fifth message obtained after signature processing.

When the terminal device receives the fifth message obtained after signature processing, the terminal device may perform, based on the stored root certificate (namely, the public key) of the target certificate management function entity, signature verification on the fifth message obtained after signature processing. After the signature verification succeeds, secure data communication may be performed by using the certificate in the fifth message. For a specific signature verification process, refer to the foregoing description. Details are not described herein again.

It should be further noted that the root certificate of the target certificate management function entity stored in the terminal device may be entered by a user or received from the interface adaptation function entity. For example, after receiving the information about the target certificate management function entity sent by the terminal device and determining that there is the locally set target interface, the interface adaptation function entity sends the notification message to the terminal device, and includes the root certificate of the target certificate management function entity in the notification message. For another example, the terminal device may receive a root certificate of at least one certificate management function entity sent by the interface adaptation function entity. For another example, the interface adaptation function entity may send a sixth message to the terminal device before, when or after sending the fifth message obtained after signature processing, where the sixth message carries the root certificate of the target certificate management function entity.

In addition, after signature verification succeeds, the terminal device may further verify the applied certificate by using the root certificate of the target certificate management function entity. To be specific, the terminal device decrypts the certificate by using the root certificate of the target certificate management function entity, and then determines whether information obtained after decryption includes the public key of the terminal device. If the information includes the public key of the terminal device, it is determined that the certificate verification succeeds, and the terminal device may perform secure data communication by using the certificate; or if the information does not include the public key of the terminal device, it is determined that the certificate verification fails, and the terminal device cannot use the certificate.

It should be further noted that a type of the certificate is not limited in the certificate application method provided in this embodiment of this application. The certificate may be a registration certificate, or may be an anonymous certificate. A difference lies in that, when the certificate is the anonymous certificate, the target certificate management function entity may not verify the identity of the terminal device when configuring the certificate for the terminal device.

In addition, in the foregoing description of this embodiment of this application, information about a certificate management function entity is used to identify the certificate management function entity, so that the terminal device or the interface adaptation function entity can determine a corresponding certificate management function entity. For example, the information about the certificate management function entity may be at least one or a combination of the following information that uniquely identifies the certificate management function entity: an identifier of the certificate management function entity, type information (for example, a certificate identifier) of a certificate that can be configured by the certificate management function entity, an identifier of a construction institution of the certificate management function entity, or a network address of the certificate management function entity.

An embodiment of this application provides a certificate application method. In the method, an interface adaptation function entity can adapt to an interface of at least one certificate management function entity, so that a terminal device can apply for certificates from different certificate management function entities by using the interface adaptation function entity. In this solution, the interface adaptation function entity can shield implementation or deployment of a certificate management function entity from the terminal device, so that the terminal device can be unaware of the certificate management function entity at an upper layer. Therefore, the terminal device does not need to locally set an interface for interacting with the certificate management function entity. This method can reduce, on the basis of ensuring that the terminal device can interact with the different certificate management function entities, a quantity of interfaces inside the terminal device for interacting with the certificate management function entities.

Based on the foregoing embodiment, this application further provides the following certificate application instance. With reference to the specific certificate application instance, the following describes an example of a procedure of a certificate application method shown in FIG. 3. In the following instance, an example in which the certificate management function entity is a CA and the interface adaptation function entity is an interface adaptation device is used for description. Instances 1 to 3 are procedures of applying for a registration certificate, and Instance 4 is a procedure of applying for an anonymous certificate. It should be noted that, in the following instances, related information about the (target) CA may be at least one or a combination of the following: an identifier of the CA, type information (for example, a certificate identifier) of a certificate that the CA can configure, or a network address of the CA.

Figure 4:
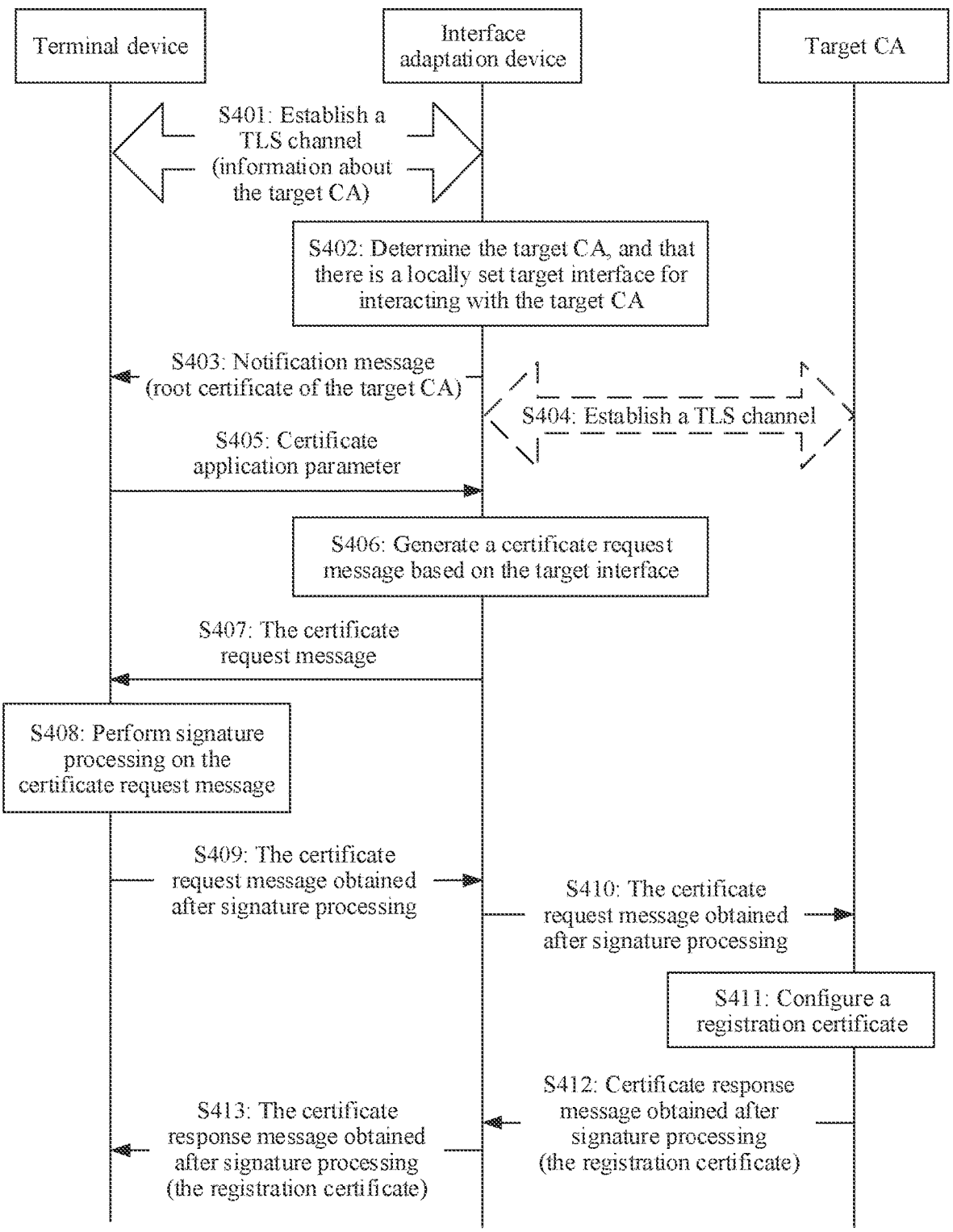
FIG. 4 is a flowchart of an instance of a certificate application method according to an embodiment of this application.

Instance 1: The following describes a certificate application procedure in this instance in detail with reference to a flowchart shown in FIG. 4.

S401: When a terminal device has a requirement for applying for a registration certificate, the terminal device determines a target CA, then establishes a TLS channel with an interface adaptation device, and send information about the target CA to the interface adaptation device in a process of establishing the TLS channel.

A root certificate of the interface adaptation device is stored inside the terminal device, and a root certificate of the terminal device is stored in the interface adaptation device. Therefore, the terminal device and the interface adaptation device can establish the TLS channel between the terminal device and the interface adaptation device based on the root certificates stored in the terminal device and the interface adaptation device.

In this embodiment of this application, the terminal device and the interface adaptation device may establish the TLS channel by using a conventional method. Optionally, the terminal device may send the information about the target CA in a message to the interface adaptation device through the established TLS channel. For example, the message that carries the information about the target CA may be a client_hello message, a certificate message, a client_key_exchange message, a certificate_verify message, a change_cipher_spec message, a finished message, or the like sent by the terminal device.

In addition, after the TLS channel between the terminal device and the interface adaptation device is established, interaction between the terminal device and the interface adaptation device may be transmitted through the TLS channel, to ensure transmission security.

S402: The interface adaptation device determines the target CA based on the information about the target CA, and determines that there is a locally set target interface for interacting with the target CA.

S403: The interface adaptation device sends a notification message to the terminal device, to notify the terminal device that the target interface for interacting with the CA is set in the interface adaptation device. The notification message further carries a root certificate of the target CA.

S404: After determining the target CA, the interface adaptation device determines whether to establish a communication connection (for example, a TLS channel) to the target CA. If determining that there is no TLS channel established between the interface adaptation device and the target CA, the interface adaptation device starts a procedure of establishing the TLS channel. If determining that there is the TLS channel established between the interface adaptation device and the target CA, there is no need to perform S404.

Similar to establishing the TLS channel between the terminal device and the interface adaptation device, both the interface adaptation device and the target CA store root certificates of each other. Therefore, the interface adaptation device and the target CA can establish the TLS channel between the interface adaptation device and the target CA based on the root certificates stored in the interface adaptation device and the target CA.

In addition, after the TLS channel between the interface adaptation device and the target CA is established, interaction between the terminal device and the interface adaptation device may be transmitted through the TLS channel, to ensure transmission security.

S405: After receiving the notification message, the terminal device sends a certificate application parameter to the interface adaptation device. The certificate application parameter includes a public key of the terminal device, and may further include identity information such as an identifier of the terminal device.

S406: The interface adaptation device generates, based on the target interface, a certificate request message including the certificate application parameter. A format of the certificate request message complies with a specification of the target interface.

S407: The interface adaptation device sends the certificate request message to the terminal device.

S408: After receiving the certificate request message, the terminal device performs signature processing on the certificate request message, to prove that the certificate request message is sent by the terminal device. For a specific signature processing process, refer to the two solutions recorded in S303 in the embodiment shown in FIG. 3. Details are not described herein again.

S409: The terminal device sends the certificate request message obtained after signature processing to the interface adaptation device.

S410: After receiving the certificate request message that is obtained after signature processing and that is sent by the terminal device, the interface adaptation device sends the certificate request message obtained after signature processing to the target CA through the target interface.

S411: After receiving the certificate request message obtained after signature processing, the target CA performs signature verification on the certificate request message, and configures the registration certificate for the terminal device based on the certificate application parameter in the certificate request message after signature verification succeeds.

Figure 3:
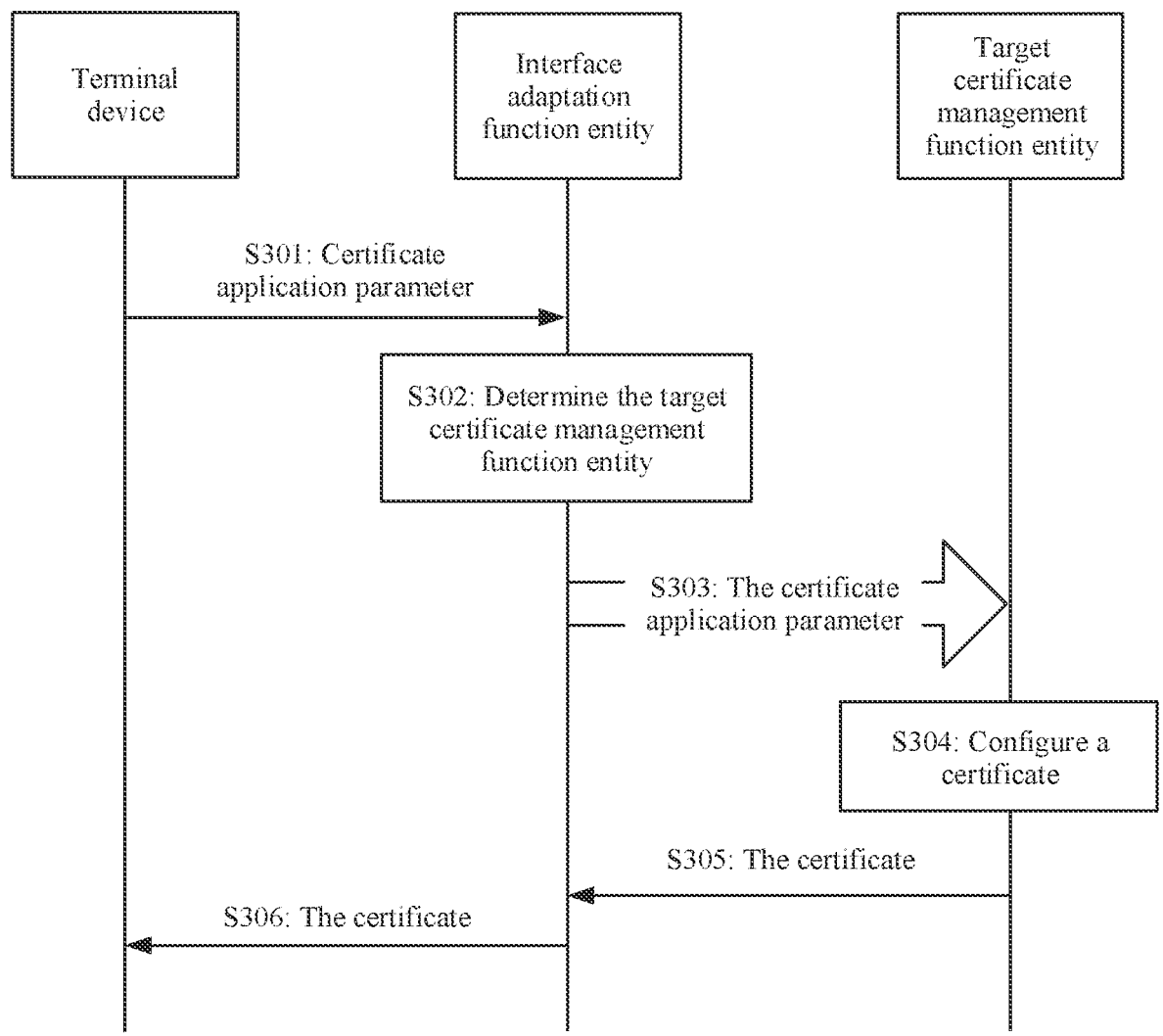
FIG. 3 is a flowchart of a certificate application method according to an embodiment of this application.

For a process in which the target CA performs signature verification on the certificate request message, refer to the two solutions recorded in S303 in the embodiment shown in FIG. 3. Details are not described herein again.

In this embodiment of this application, for a process in which the target CA configures the registration certificate for the terminal device, refer to descriptions in the certificate application process in FIG. 1A and FIG. 1B or S304 in the embodiment shown in FIG. 3. Details are not described herein again.

S412: The target CA generates a certificate response message including the registration certificate, performs signature processing on the certificate response message, and then sends the certificate response message obtained after signature processing to the interface adaptation device.

S413: After receiving the certificate response message obtained after signature processing from the target CA, the interface adaptation device performs signature verification on the certificate response message obtained after signature processing by using the root certificate of the target CA, and may further verify the registration certificate by using the root certificate of the target CA after the verification succeeds. After determining that the registration certificate is successfully verified, the terminal device may perform secure data communication by using the registration certificate.

For a process in which the terminal device verifies the registration certificate, refer to the description in S306 in the embodiment shown in FIG. 3. Details are not described herein again.

Figure 5:
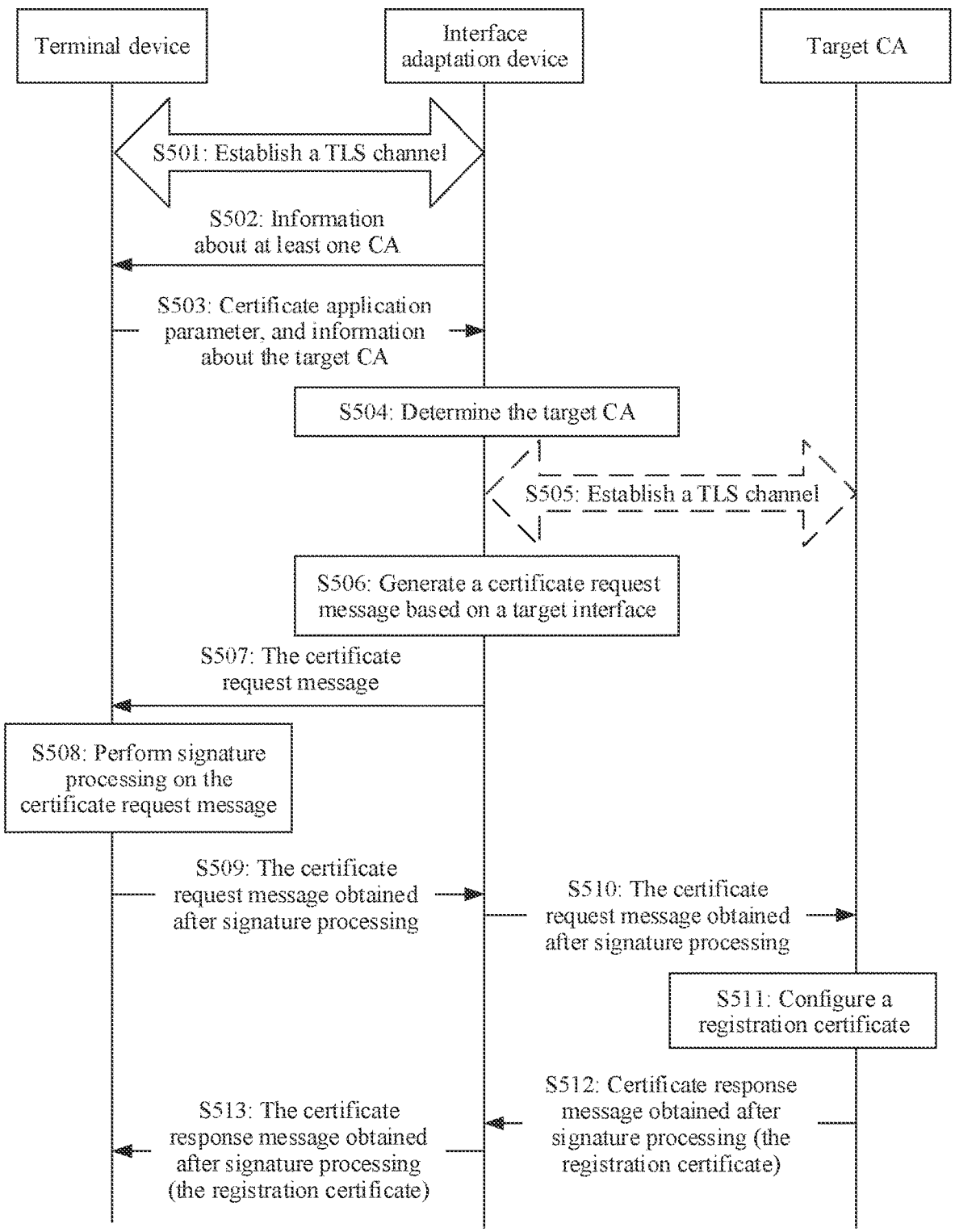
FIG. 5 is a flowchart of an instance of a certificate application method according to an embodiment of this application.

Instance 2: The following describes a certificate application procedure in this instance in detail with reference to a flowchart shown in FIG. 5.

S501: A terminal device establishes a TLS channel with an interface adaptation device.

A root certificate of the interface adaptation device is stored inside the terminal device, and a root certificate of the terminal device is stored in the interface adaptation device. Therefore, the terminal device and the interface adaptation device can establish the TLS channel between the terminal device and the interface adaptation device based on the root certificates stored in the terminal device and the interface adaptation device.

In addition, after the TLS channel between the terminal device and the interface adaptation device is established, interaction between the terminal device and the interface adaptation device may be transmitted through the TLS channel, to ensure transmission security.

S502: The interface adaptation device sends information about at least one CA to the terminal device, where an interface for interacting with the at least one CA is set in the interface adaptation device.

Optionally, the interface adaptation device may further send a root certificate of the at least one CA to the terminal device, so as to subsequently verify a registration certificate.

S503: The terminal device receives and stores the information about the at least one CA from the interface adaptation device. When the terminal device has a requirement for applying for the registration certificate, the terminal device determines a target CA from the at least one CA, and sends a certificate application parameter and information about the target CA to the interface adaptation device.

S504: After receiving the certificate application parameter and the information about the target CA, the interface adaptation device determines the target CA based on the information about the target CA.

S505: After determining the target CA, the interface adaptation device determines whether to establish a communication connection (for example, a TLS channel) to the target CA. If determining that there is no TLS channel established between the interface adaptation device and the target CA, the interface adaptation device starts a procedure of establishing the TLS channel. If determining that there is the TLS channel established between the interface adaptation device and the target CA, there is no need to perform S505.

Similar to establishing the TLS channel between the terminal device and the interface adaptation device, both the interface adaptation device and the target CA store root certificates of each other. Therefore, the interface adaptation device and the target CA can establish the TLS channel between the interface adaptation device and the target CA based on the root certificates stored in the interface adaptation device and the target CA.

In addition, after the TLS channel between the interface adaptation device and the target CA is established, interaction between the terminal device and the interface adaptation device may be transmitted through the TLS channel, to ensure transmission security.

In this instance, other steps S506 to S513 are the same as steps S406 to S413 in Instance 1. Therefore, for a specific process of these steps, refer to specific descriptions of related steps in Instance 1, and details are not described herein again.

Figure 6:
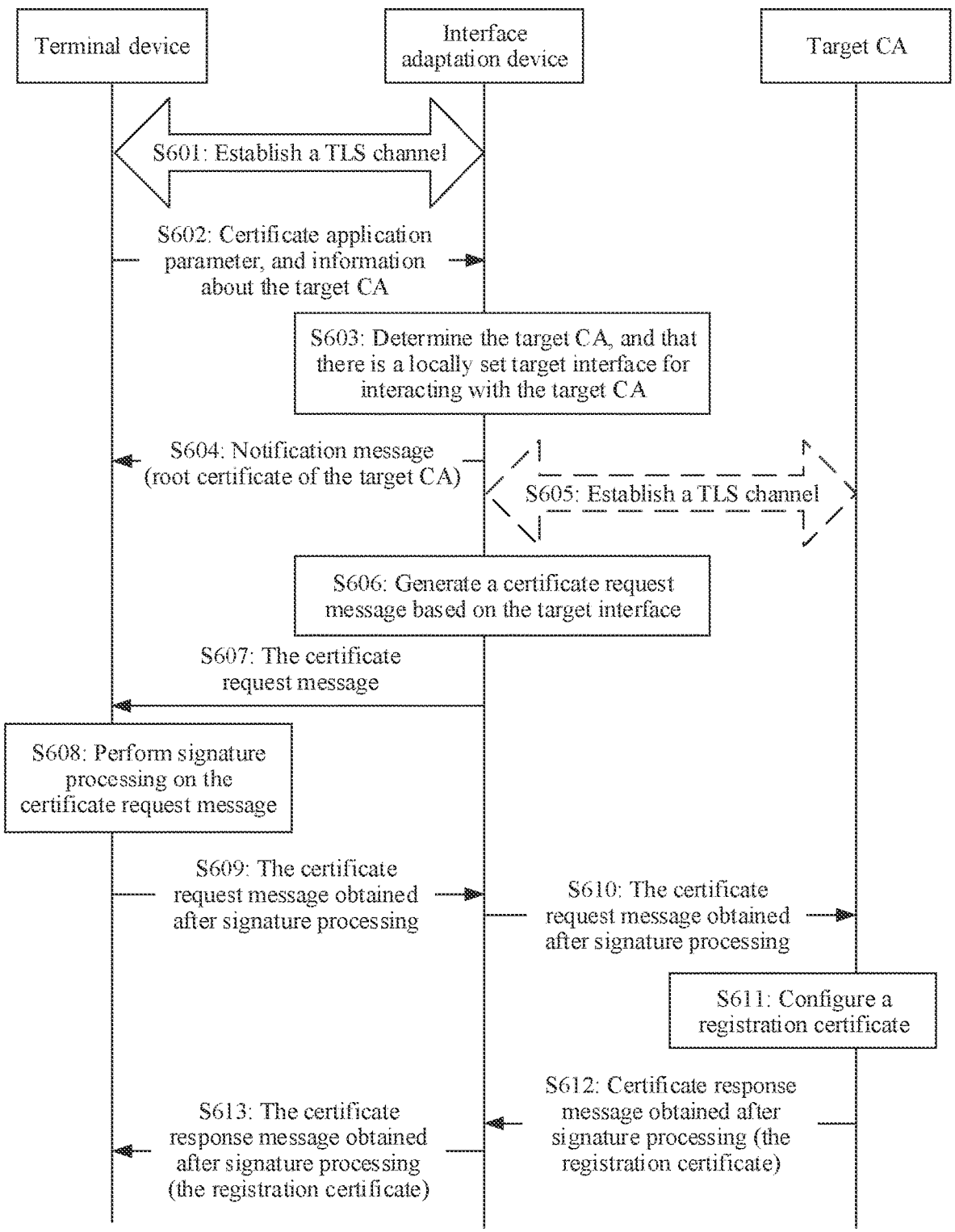
FIG. 6 is a flowchart of an instance of a certificate application method according to an embodiment of this application.

Instance 3: The following describes a certificate application procedure in this instance in detail with reference to a flowchart shown in FIG. 6.

S601: Same as S501 in Instance 2, a terminal device establishes a TLS channel with an interface adaptation device.

S602: When the terminal device has a requirement for applying for a registration certificate, the terminal device determines a target CA, and sends a certificate application parameter and information about the target CA to the interface adaptation device.

S603: The interface adaptation device determines the target CA based on the information about the target CA, and determines that there is a locally set target interface for interacting with the target CA.

S604: The interface adaptation device sends a notification message to the terminal device, to notify the terminal device that the target interface for interacting with the CA is set in the interface adaptation device. The notification message further carries a root certificate of the target CA.

In this instance, other steps S605 to 613 are the same as steps S505 to S513 in Instance 2, and details are not described herein again.

Figure 7:
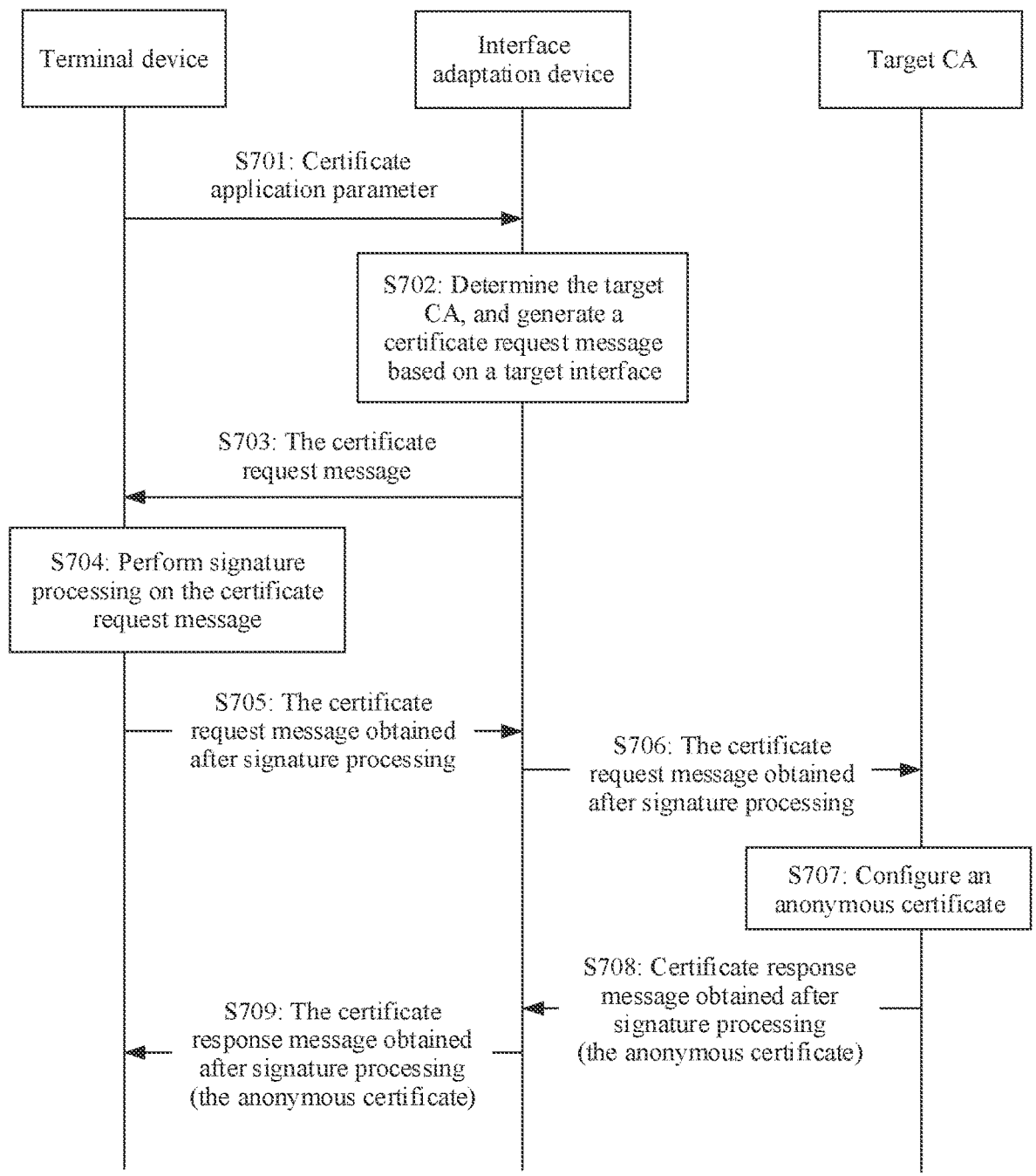
FIG. 7 is a flowchart of an instance of a certificate application method according to an embodiment of this application.

Instance 4: A procedure for applying for an anonymous certificate is performed after a procedure for applying for a registration certificate, that is, a TLS channel has been established between a terminal device and an interface adaptation device, and a TLS channel has been established between the interface adaptation device and a target CA. Therefore, a step of establishing the TLS channel is not included in this instance. The following describes a certificate application procedure in this instance in detail with reference to a flowchart shown in FIG. 7.

S701: When a terminal device has a requirement for applying for an anonymous certificate, the terminal device sends a certificate application parameter to an interface adaptation device.

S702: After receiving the certificate application parameter from the terminal device, the interface adaptation device determines, based on a locally stored correspondence between an identifier of the terminal device and a CA, a target CA corresponding to the identifier of the terminal device in the certificate application parameter. Then, the interface adaptation device generates, based on a target interface set for interacting with the target CA, a certificate request message including the certificate application parameter.

When each terminal device applies for a registration certificate, the interface adaptation device establishes a correspondence between an identifier of the terminal device and a CA that configures the registration certificate for the terminal device. Therefore, the interface adaptation device can quickly determine the target CA when any terminal device applies for an anonymous certificate after applying for a registration certificate.

In this instance, other steps S703 to 709 are the same as steps S407 to S413 in Instance 1. Therefore, for a specific process of these steps, refer to specific descriptions of related steps in Instance 1, and details are not described herein again.

Figure 8:
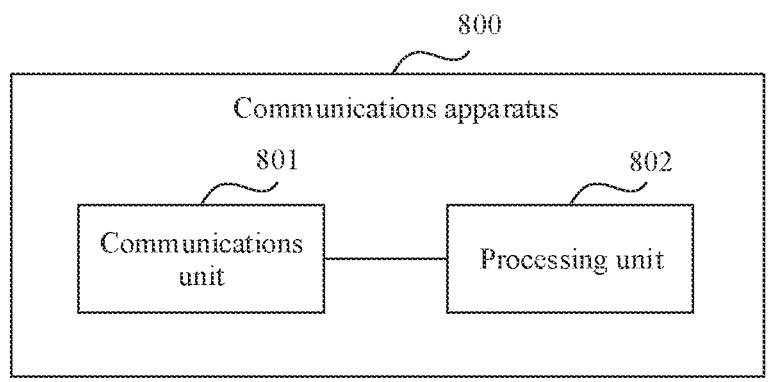
FIG. 8 is a diagram of a structure of a communications apparatus according to an embodiment of this application.

Based on a same technical concept, this application further provides a communications apparatus. A structure of the apparatus is shown in FIG. 8, and the apparatus includes a communications unit 801 and a processing unit 802. The communications apparatus 800 may be applied to a terminal device, an interface adaptation function entity, or a certificate management function entity in the certificate management architecture shown in FIG. 2, and may implement the certificate application methods shown in FIG. 3 to FIG. 7. The following describes functions of the units in the apparatus 800.

The communications unit 801 is configured to receive and send data.

When the communications apparatus 800 is applied to the terminal device, the communications unit 801 may also be referred to as a transceiver, and may be implemented by using a mobile communications module and/or a wireless communications module.

The mobile communications module may provide a solution that is applied to the terminal device and that includes wireless communication such as 2G, 3G, 4G, and 5G. The mobile communications module may include at least one antenna, at least one filter, a switch, a power amplifier, a low noise amplifier (LNA), and the like. The terminal device may access a mobile communications network by using the mobile communications module, and further access the certificate management architecture over the mobile communications network.

The wireless communications module may provide a wireless communication solution that includes a wireless local area network (WLAN) (for example, a wireless fidelity (Wi-Fi) network), Bluetooth (BT), a global navigation satellite system (GLASS), frequency modulation (FM), a near field communication (NFC), and the like and that is applied to the terminal device. The wireless communications module 160 may include at least one antenna and one or more components of at least one communications processing module. The terminal device may access the wireless communications network by using the wireless communications module, and further access the certificate management architecture over the wireless communications network.

When the communications apparatus 800 is applied to the interface adaptation function entity or the certificate management function entity, the communications unit 801 may also be referred to as a physical interface, a communications module, a communications interface, or an input/output interface. The interface adaptation function entity or the certificate management function entity may be connected to a network cable or a cable by using the communications unit, so as to establish a physical connection to another device.

The following describes functions of the processing unit 802 when the communications apparatus 800 is applied to the terminal device.

The processing unit 802 is configured to: send a certificate application parameter to an interface adaptation function entity by using the communications unit 801 and receive a certificate from the interface adaptation function entity by using the communications unit 801, where the certificate is configured by a target certificate management function entity for the terminal device.

In an implementation, the processing unit 802 is further configured to: receive a certificate request message from the interface adaptation function entity by using the communications unit 801 after sending the certificate application parameter to the interface adaptation function entity by using the communications unit 801 and before receiving the certificate from the interface adaptation function entity by using the communications unit 801, where the certificate request message includes the certificate application parameter; perform signature processing on the certificate request message; send, by using the communications unit 801, the certificate request message obtained after signature processing to the interface adaptation function entity, so that the interface adaptation function entity forwards the certificate request message obtained after signature processing to the target certificate management function entity; and when receiving the certificate from the interface adaptation function entity by using the communications unit 801, the processing unit 802 is specifically configured to: receive a certificate response message from the interface adaptation function entity by using the communications unit 801, where the certificate response message is received by the interface adaptation function entity from the target certificate management function entity, and the certificate response message includes the certificate.

In an implementation, the processing unit 802 is further configured to: send information about the target certificate management function entity to the interface adaptation function entity by using the communications unit 801 before receiving the certificate from the interface adaptation function entity by using the communications unit 801.

In an implementation, the processing unit 802 is further configured to: receive a notification message from the interface adaptation function entity by using the communications unit 801 after sending the information about the target certificate management function entity to the interface adaptation function entity by using the communications unit 801, where the notification message is used to notify the terminal device that a target interface for interacting with the target certificate management function entity is set in the interface adaptation function entity.

In an implementation, the notification message includes a root certificate of the target certificate management function entity; and the processing unit 802 is further configured to: verify the certificate included in the certificate response message based on the root certificate of the target certificate management function entity after receiving the certificate response message from the interface adaptation function entity by using the communications unit 801.

In an implementation, the processing unit 802 is further configured to: receive information about at least one certificate management function entity from the interface adaptation function entity by using the communications unit 801 before sending the information about the target certificate management function entity to the interface adaptation function entity by using the communications unit 801, where the information about the at least one certificate management function entity includes the information about the target certificate management function entity, and an interface for interacting with the at least one certificate management function entity is set in the interface adaptation function entity; and select the target certificate management function entity from the at least one certificate management function entity.

The following describes functions of the processing unit 802 when the communications apparatus 800 is applied to the interface adaptation function entity.

The processing unit 802 is configured to receive a certificate application parameter from a terminal device by using the communications unit 801; determine a target certificate management function entity that configures a certificate for the terminal device; send the certificate application parameter to the target certificate management function entity by using the communications wilt 801, so that the target certificate management function entity configures the certificate for the terminal device based on the certificate application parameter; and receive the certificate from the target certificate management function entity by using the communications unit 801, and send the certificate to the terminal device by using the communications unit 801.

In an implementation, a target interface for interacting with the target certificate management function entity is set in the interface adaptation function entity; when sending the certificate application parameter to the target certificate management function entity by using the communications unit 801, the processing unit 802 is specifically configured to: send the certificate application parameter to the target certificate management function entity by using the communications unit 801 and the target interface; and when receiving the certificate from the target certificate management function entity by using the communications unit 801, the processing unit 802 is specifically configured to: receive the certificate from the target certificate management function entity by using the communications unit 801 and the target interface.

In an implementation, when sending the certificate application parameter to the target certificate management function entity by using the communications unit 801 and the target interface, the processing unit 802 is specifically configured to: generate a certificate request message including the certificate application parameter based on the target interface, and send the certificate request message to the terminal device by using the communications unit 801; and receive the certificate request message obtained after signature processing from the terminal device by using the communications unit 801, and send the certificate request message obtained after signature processing to the target certificate management function entity by using the communications unit 801 and the target interface; when receiving the certificate from the target certificate management function entity by using the communications unit 801, the processing unit 802 is specifically configured to: receive a certificate response message from the target certificate management function entity by using the communications unit 801, where the certificate response message includes the certificate configured by the target certificate management function entity for the terminal device; and when sending the certificate to the terminal device by using the communications unit 801, the processing unit 802 is specifically configured to: send the certificate response message to the terminal device by using the communications unit 801.

In an implementation, when determining the target certificate management function entity that configures the certificate for the terminal device, the processing unit 802 is specifically configured to: receive information about the target certificate management function entity from the terminal device by using the communications unit 801, and determine the target certificate management function entity based on the information about the target certificate management function entity; or determine an identifier of the terminal device, determine, based on a locally stored correspondence between the identifier of the terminal device and information about a certificate management function entity, information about the target certificate management function entity corresponding to the identifier of the terminal device, and determine the target certificate management function entity based on the information about the target certificate management function entity.

In an implementation, the processing unit 802 is further configured to: after receiving the information about the target certificate management function entity from the terminal device by using the communications unit 801, determine that there is a locally set target interface for interacting with the target certificate management function entity; and send a notification message to the terminal device by using the communications unit 801, where the notification message is used to notify the terminal device that the target interface for interacting with the target certificate management function entity is set in the interface adaptation function entity.

In an implementation, the notification message includes a root certificate of the target certificate management function entity.

In an implementation, the processing unit 802 is further configured to: send information about at least one certificate management function entity to the terminal device by using the communications unit 801 before receiving the information about the target certificate management function entity from the terminal device by using the communications unit 801, where the at least one certificate management function entity includes the target certificate management function entity, and an interface for interacting with the at least one certificate management function entity is set in the interface adaptation function entity.

The following describes functions of the processing unit 802 when the communications apparatus 800 is applied to the certificate management function entity.

The processing unit 802 is configured to receive a certificate application parameter of a terminal device from an interface adaptation function entity by using the communications unit 801; configure a certificate for the terminal device based on the certificate application parameter; and send the certificate to the interface adaptation function entity by using the communications unit 801.

In an implementation, when receiving the certificate application parameter of the terminal device from the interface adaptation function entity by using the communications unit 801, the processing unit 802 is specifically configured to: receive from the interface adaptation function entity by using the communications unit 801, a certificate request message on which the terminal device performs signature processing, where the certificate request message includes the certificate application parameter; the processing unit 802 is further configured to: before configuring the certificate for the terminal device based on the certificate application parameter, perform signature verification on the certificate request message obtained after signature processing, where the verification succeeds; and when sending the certificate to the interface adaptation function entity by using the communications unit 801, the processing unit 802 is specifically configured to: send a certificate response message to the interface adaptation function entity by using the communications unit 801, where the certificate response message includes the certificate.

Figure 9:
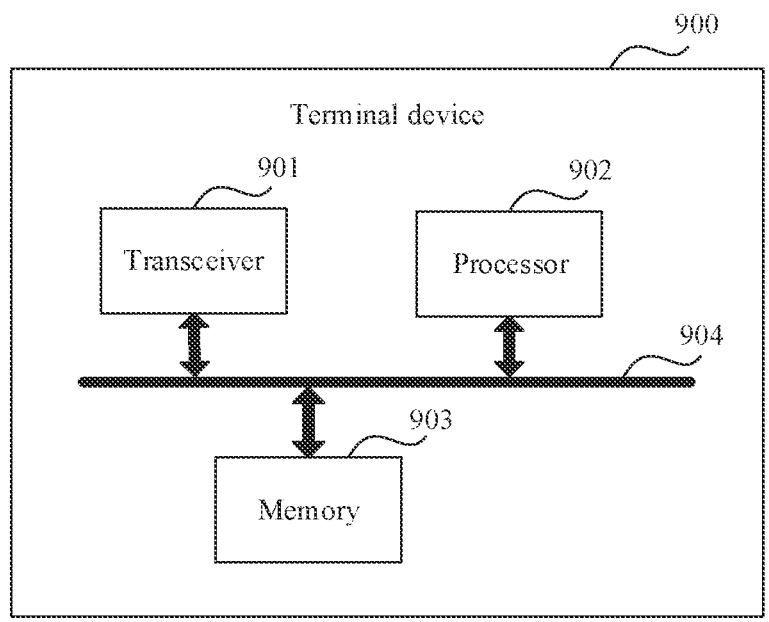
FIG. 9 is a diagram of a structure of a terminal device according to an embodiment of this application.

Based on a same technical concept, this application further provides a terminal device. The terminal device may be applied to the certificate management architecture shown in FIG. 2, and may implement functions of the terminal device in the certificate application methods shown in FIG. 3 to FIG. 7. Refer to FIG. 9. The terminal device includes a transceiver 901, a processor 902, and a memory 903. The transceiver 901, the processor 902, and the memory 903 are connected to each other.

Optionally, the transceiver 901, the processor 902, and the memory 903 are connected to each other through a bus 904. The bus 904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

The transceiver 901 is configured to receive and send data, to implement communication interaction with another device. For example, the transceiver 901 may be implemented by using a mobile communications module and/or a wireless communications module.

The processor 902 is configured to: send a certificate application parameter to an interface adaptation function entity by using the transceiver 901; and receive a certificate from the interface adaptation function entity by using the transceiver 901, where the certificate is configured by a target certificate management function entity for the terminal device 900.

Optionally, the processor 902 is further configured to: receive a certificate request message from the interface adaptation function entity by using the transceiver 901 after sending the certificate application parameter to the interface adaptation function entity by using the transceiver 901 and before receiving the certificate from the interface adaptation function entity by using the transceiver 901, where the certificate request message includes the certificate application parameter; and perform signature processing on the certificate request message; send, by using the transceiver 901, the certificate request message obtained after signature processing to the interface adaptation function entity, so that the interface adaptation function entity forwards the certificate request message obtained after signature processing to the target certificate management function entity; and when receiving the certificate from the interface adaptation function entity by using the communications unit, the processor 902 is specifically configured to: receive a certificate response message from the interface adaptation function entity by using the transceiver 901, where the certificate response message is received by the interface adaptation function entity from the target certificate management function entity, and the certificate response message includes the certificate.

Optionally, the processor 902 is further configured to: send information about the target certificate management function entity to the interface adaptation function entity by using the transceiver 901 before receiving the certificate from the interface adaptation function entity by using the transceiver 901.

Optionally, the processor 902 is further configured to: receive a notification message from the interface adaptation function entity by using the transceiver 901 after sending the information about the target certificate management function entity to the interface adaptation function entity by using the transceiver 901, where the notification message is used to notify the terminal device that a target interface for interacting with the target certificate management function entity is set in the interface adaptation function entity.

Optionally, the notification message includes a root certificate of the target certificate management function entity, and the processor 902 is further configured to: verify the certificate included in the certificate response message based on the root certificate of the target certificate management function entity after receiving the certificate response message from the interface adaptation function entity by using the transceiver 901.

Optionally, the processor 902 is further configured to: receive information about at least one certificate management function entity from the interface adaptation function entity by using the transceiver 901 before sending the information about the target certificate management function entity to the interface adaptation function entity by using the transceiver 901, where the information about the at least one certificate management function entity includes the information about the target certificate management function entity, and an interface for interacting with the at least one certificate management function entity is set in the interface adaptation function entity; and select the target certificate management function entity from the at least one certificate management function entity.

The memory 903 is configured to store program instructions, data, and the like. Specifically, the program instructions may include program code, and the program code includes computer operation instructions. The memory 903 may include a random access memory (RAM), or may include a non-volatile memory, such as at least one magnetic disk memory. The processor 902 executes the program instructions stored in the memory 903, and implements the foregoing functions by using the data stored in the memory 903, thereby implementing the certificate management methods provided in the foregoing embodiments.

Figure 10:
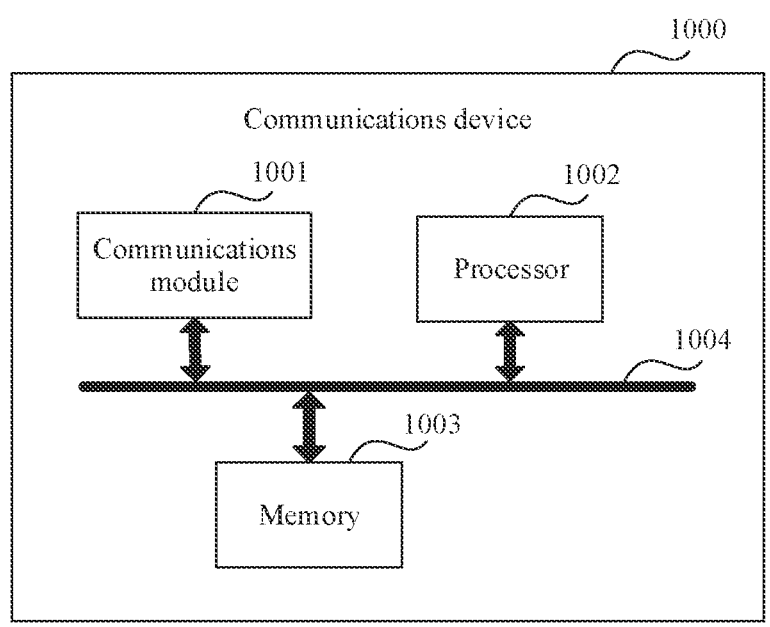
FIG. 10 is a diagram of a structure of a communications device according to an embodiment of this application.

Based on a same technical concept, this application further provides a communications device. The communications device may be applied to the certificate management architecture shown in FIG. 2, and may implement functions of the interface adaptation function entity or the certificate management function entity in the certificate application methods shown in FIG. 3 to FIG. 7. Refer to FIG. 10. The communications device 1000 includes a communications module 1001, a processor 1002, and a memory 1003. The communications module 1001, the processor 1002, and the memory 1003 are connected to each other.

Optionally, the communications module 1001, the processor 1002, and the memory 1003 are connected to each other through a bus 1004. The bus 1004 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 10, but this does not mean that there is only one bus or only one type of bus.

The communications module 1001 is configured to receive and send data, to implement communication interaction with another device. For example, the communications module 1001 may be implemented through a physical interface.

In an implementation, the communications device 1000 is applied to the interface adaptation function entity, and the processor 1002 is specifically configured to: receive a certificate application parameter from a terminal device by using the communications module 1001; determine a target certificate management function entity that configures a certificate for the terminal device; send the certificate application parameter to the target certificate management function entity by using the communications module 1001, so that the target certificate management function entity configures a certificate for the terminal device based on the certificate application parameter; and receive the certificate from the target certificate management function entity by using the communications module 1001, and send the certificate to the terminal device by using the communications module 1001.

Optionally, a target interface for interacting with the target certificate management function entity is set in the interface adaptation function entity; when sending the certificate application parameter to the target certificate management function entity by using the communications module 1001, the processor 1002 is specifically configured to: send the certificate application parameter to the target certificate management function entity by using the communications module 1001 and the target interface; and when receiving the certificate from the target certificate management function entity by using the communications module 1001, the processor 1002 is specifically configured to: receive the certificate from the target certificate management function entity by using the communications module 1001 and the target interface.

Optionally, when sending the certificate application parameter to the target certificate management function entity by using the communications module 1001 and the target interface, the processor 1002 is specifically configured to: generate a certificate request message including the certificate application parameter based on the target interface, and send the certificate request message to the terminal device by using the communications module 1001; and receive the certificate request message obtained after signature processing from the terminal device by using the communications module 1001, and send the certificate request message obtained after signature processing to the target certificate management function entity by using the communications module 1001 and the target interface, when receiving the certificate from the target certificate management function entity by using the communications module 1001, the processor 1002 is specifically configured to: receive a certificate response message from the target certificate management function entity by using the communications module 1001, where the certificate response message includes the certificate configured by the target certificate management function entity for the terminal device; and when sending the certificate to the terminal device by using the communications module 1001, the processor 1002 is specifically configured to: send the certificate response message to the terminal device by using the communications module 1001.

Optionally, when determining the target certificate management function entity that configures the certificate for the terminal device, the processor 1002 is specifically configured to: receive information about the target certificate management function entity from the terminal device by using the communications module 1001, and determine the target certificate management function entity based on the information about the target certificate management function entity; or determine an identifier of the terminal device, determine, based on a locally stored correspondence between the identifier of the terminal device and information about a certificate management function entity, information about the target certificate management function entity corresponding to the identifier of the terminal device, and determine the target certificate management function entity based on the information about the target certificate management function entity.

Optionally, the processor 1002 is further configured to: after receiving the information about the target certificate management function entity from the terminal device by using the communications module 1001, determine that there is a locally set target interface for interacting with the target certificate management function entity; and send a notification message to the terminal device by using the communications module 1001, where the notification message is used to notify the terminal device that the target interface for interacting with the target certificate management function entity is set in the interface adaptation function entity.

Optionally, the notification message includes a root certificate of the target certificate management function entity.

Optionally, the processor 1002 is further configured to: send information about at least one certificate management function entity to the terminal device by using the communications module 1001 before receiving the information about the target certificate management function entity from the terminal device by using the communications module 1001, where the at least one certificate management function entity includes the target certificate management function entity, and an interface for interacting with the at least one certificate management function entity is set in the interface adaptation function entity.

In another implementation, the communications device 1000 is applied to the certificate management function entity, and the processor 1002 is specifically configured to: receive a certificate application parameter of a terminal device from an interface adaptation function entity by using the communications module 1001; configure a certificate for the terminal device based on the certificate application parameter; and send the certificate to the interface adaptation function entity by using the communications module 1001.

Optionally, when receiving the certificate application parameter of the terminal device from the interface adaptation function entity by using the communications module 1001, the processor 1002 is specifically configured to: receive from the interface adaptation function entity by using the communications module 1001, a certificate request message on which the terminal device performs signature processing, where the certificate request message includes the certificate application parameter; the processor 1002 is further configured to: before configuring the certificate for the terminal device based on the certificate application parameter, perform signature verification on the certificate request message obtained after signature processing, where the verification succeeds; when sending the certificate to the interface adaptation function entity by using the communications module 1001, the processor 1002 is specifically configured to: send a certificate response message to the interface adaptation function entity by using the communications module 1001, where the certificate response message includes the certificate.

The memory 1003 is configured to store program instructions, data, and the like. Specifically, the program instructions may include program code, and the program code includes computer operation instructions. The memory 1003 may include a random access memory (RAM), or may include a non-volatile memory, such as at least one magnetic disk memory. The processor 1002 executes the program instructions stored in the memory 1003, and implements the foregoing functions by using the data stored in the memory 1003, thereby implementing the certificate management methods provided in the foregoing embodiments.

It may be understood that the memory in FIG. 9 and FIG. 10 in this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the systems and methods described in this specification includes but is not limited to these and any memory of another appropriate type.

Based on the foregoing embodiments, an embodiment of this application further provides a computer program. When the computer program runs on a computer, the computer is enabled to perform the certificate application methods provided in the embodiments shown in FIG. 3 to FIG. 7.

Based on the foregoing embodiments, an embodiment of this application further provides a computer-readable storage medium. The computer-readable storage medium stores a computer program. When the computer program is executed by a computer, the computer is enabled to perform the certificate application methods provided in the embodiments shown in FIG. 3 to FIG. 7. The storage medium may be any available medium accessible to a computer. The following provides an example but does not impose a limitation: The computer-readable medium may include a RAM, a ROM, an EEPROM, a CD-ROM, another optical disc storage, a disk storage medium, or another magnetic storage device, or any other medium that can carry or store expected program code in a form of an instruction or a data structure and can be accessed by a computer.

Based on the foregoing embodiments, an embodiment of this application further provides a chip. The chip is configured to read a computer program stored in a memory, to implement the certificate application methods provided in the embodiments shown in FIG. 3 to FIG. 7.

Based on the foregoing embodiments, an embodiment of this application provides a chip system. The chip system includes a processor, configured to support a computer apparatus in implementing functions related to the terminal device, the interface adaptation function entity, or the certificate management function entity in the embodiments shown in FIG. 3 to FIG. 7. In a possible design, the chip system further includes a memory, and the memory is configured to store a program and data that are used for the computer apparatus. The chip system may include a chip, or may include a chip and another discrete device.

In conclusion, this application provides a certificate application method and a device. In the solutions, an interface adaptation function entity can interact with a certificate management function entity that configures a certificate for a terminal device. When the terminal device needs to apply for a certificate, the terminal device can send a certificate application parameter of the terminal device to the interface adaptation function entity, so that the interface adaptation function entity can apply for the certificate from the certificate management function entity for the terminal device based on the certificate application parameter, and send the certificate to the terminal device after the certificate is applied for successfully. In the solutions, the interface adaptation function entity can shield implementation or deployment of the certificate management function entity from the terminal device, so that the terminal device can be unaware of the certificate management function entity at an upper layer. Therefore, the terminal device does not need to locally set an interface fir interacting with the certificate management function entity. This method can reduce, on the basis of ensuring that the terminal device can interact with different certificate management function entities, a quantity of interfaces inside the terminal device for interacting with the certificate management function entities.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the claims of this application and equivalent technologies thereof.

What is claimed is:

1. A terminal device, comprising:
   at least one processor; and
   at least one memory coupled to the at least one processor and storing programming instructions for execution by the at least one processor to:
      receive information about multiple certificate management function entities from an interface adaptation function entity;
      select, based on the information about the multiple certificate management function entities, a target certificate management function entity from the multiple certificate management function entities;
      in response to selecting the target certificate management function entity from the multiple certificate management function entities, send a certificate application parameter and information about the target certificate management function entity to the interface adaptation function entity;
      in response to sending the certificate application parameter and the information about the target certificate management function entity to the interface adaptation function entity, receive a notification message indicating that a target interface for interacting with the target certificate management function entity is set in the interface adaptation function entity, wherein the notification message comprises a root certificate of the target certificate management function entity;
      receive a first certificate request message from the interface adaptation function entity, wherein the first certificate request message comprises the certificate application parameter;
      perform signature processing on the first certificate request message to generate a second certificate request message, wherein the second certificate request message comprises the certificate application parameter;
      send the second certificate request message to the interface adaptation function entity;
      receive a certificate from the interface adaptation function entity, wherein the certificate is configured by the target certificate management function entity for the terminal device;
      decrypt the certificate by using the root certificate of the target certificate management function entity to generate a decrypted certificate;
      determine whether the decrypted certificate includes a public key of the terminal device, wherein the public key is generated by the terminal device; and
      in response to determining that the decrypted certificate includes the public key of the terminal device, determine that a certificate verification of the certificate succeeds.

2. The terminal device according to claim 1, wherein the programming instructions are for execution by the at least one processor to:
   send information used to determine the target certificate management function entity to the interface adaptation function entity.

3. The terminal device according to claim 1, wherein the interface adaptation function entity is configured with multiple interfaces for interacting with the multiple certificate management function entities, and the multiple certificate management function entities include the target certificate management function entity.

4. The terminal device according to claim 1, wherein the terminal device and the interface adaptation function entity perform communication interaction through a transport layer security channel.

5. The terminal device according to claim 1, wherein the certificate is a registration certificate or an anonymous certificate.

6. The terminal device according to claim 1, wherein the certificate application parameter includes the public key of the terminal device.

7. The terminal device according to claim 1, wherein the certificate application parameter includes an identifier of the terminal device indicating an identity of the terminal device.

8. The terminal device according to claim 1, wherein the programming instructions are for execution by the at least one processor to:
   receive a certificate response message from the interface adaptation function entity, wherein the certificate response message comprises the certificate.

9. The terminal device according to claim 1, wherein the programming instructions are for execution by the at least one processor to:
   receive the root certificate of the target certificate management function entity from the interface adaptation function entity; and
   verify, based on the root certificate of the target certificate management function entity, the certificate.

10. An interface adaptation function entity, comprising:
    at least one processor; and
    at least one memory coupled to the at least one processor and storing programming instructions for execution by the at least one processor to:
       send information about multiple certificate management function entities to a terminal device, wherein a target certificate management function entity is selected from the multiple certificate management function entities based on the information about the multiple certificate management function entities;
       receive a certificate application parameter and information about the target certificate management function entity from the terminal device;

in response to receiving the information about the target certificate management function entity, send a notification message indicating that a target interface for interacting with the target certificate management function entity is set in the interface adaptation function entity, wherein the notification message comprises a root certificate of the target certificate management function entity;

send a first certificate request message to the terminal device, wherein the first certificate request message comprises the certificate application parameter, and a second certificate request message is generated by performing signature processing on the first certificate request message by the terminal device;

receive the second certificate request message from the terminal device, wherein the second certificate request message comprises the certificate application parameter;

determine the target certificate management function entity that configures a certificate for the terminal device;

send the certificate application parameter to the target certificate management function entity;

receive the certificate from the target certificate management function entity; and send the certificate to the terminal device, wherein the certificate is decrypted by using the root certificate of the target certificate management function entity to generate a decrypted certificate, whether the decrypted certificate includes a public key of the terminal device is determined, the public key is generated by the terminal device, and in response to a determination that the decrypted certificate includes the public key of the terminal device, it is determined that a certificate verification of the certificate succeeds.

11. The interface adaptation function entity according to claim 10, wherein the programming instructions are for execution by the at least one processor to:
receive information used to determine the target certificate management function entity from the terminal device; and
determine the target certificate management function entity based on the information used to determine the target certificate management function entity.

12. The interface adaptation function entity according to claim 10, wherein the interface adaptation function entity is configured with multiple interfaces for interacting with the multiple certificate management function entities, and the multiple certificate management function entities include the target certificate management function entity.

13. The interface adaptation function entity according to claim 10, wherein at least one of following occurs:
the terminal device and the interface adaptation function entity perform communication interaction through a first transport layer security channel; or
the target certificate management function entity and the interface adaptation function entity perform communication interaction through a second transport layer security channel.

14. The interface adaptation function entity according to claim 10, wherein the certificate is a registration certificate or an anonymous certificate.

15. The interface adaptation function entity according to claim 10, wherein the certificate application parameter includes the public key of the terminal device.

16. The interface adaptation function entity according to claim 10, wherein the certificate application parameter includes an identifier of the terminal device indicating an identity of the terminal device.

17. The interface adaptation function entity according to claim 10, wherein the programming instructions are for execution by the at least one processor to:
send a certificate response message to the terminal device, wherein the certificate response message comprises the certificate.

18. The interface adaptation function entity according to claim 10, wherein the programming instructions are for execution by the at least one processor to:
send the root certificate of the target certificate management function entity to the terminal device, wherein the root certificate is used for verifying the certificate.

19. A target certificate management function entity, comprising:
at least one processor; and
at least one memory coupled to the at least one processor and storing programming instructions for execution by the at least one processor to:
receive, from an interface adaptation function entity, a certificate request message on which a terminal device performs signature processing, wherein the certificate request message comprises a certificate application parameter of the terminal device, wherein the certificate request message is generated by the terminal device based on performing the signature processing on a first certificate request message, wherein the first certificate request message is received by the terminal device from the interface adaptation function entity, and the first certificate request message comprises the certificate application parameter, wherein the terminal device receives information about multiple certificate management function entities from the interface adaptation function entity, and the terminal device selects, based on the information about the multiple certificate management function entities, the target certificate management function entity from the multiple certificate management function entities, wherein in response to selecting the target certificate management function entity from the multiple certificate management function entities, the terminal device sends the certificate application parameter and information about the target certificate management function entity to the interface adaptation function entity, and wherein in response to sending the certificate application parameter and the information about the target certificate management function entity to the interface adaptation function entity, the terminal device receives a notification message indicating that a target interface for interacting with the target certificate management function entity is set in the interface adaptation function entity, wherein the notification message comprises a root certificate of the target certificate management function entity;
configure a certificate for the terminal device based on the certificate application parameter; and
send the certificate to the interface adaptation function entity, wherein the certificate is decrypted by using the root certificate of the target certificate management function entity to generate a decrypted certificate, whether the decrypted certificate includes a public key of the terminal device is determined, the public key is generated by the terminal device, and in response to a determination that the decrypted certificate includes the public key of the terminal device, it is determined that a certificate verification of the certificate succeeds.

20. The target certificate management function entity according to claim 19, wherein the programming instructions are for execution by the at least one processor to:
perform signature verification on the certificate request message; and
in response to determining that the signature verification succeeds, send a certificate response message to the interface adaptation function entity, wherein the certificate response message comprises the certificate.

21. The target certificate management function entity according to claim 19, wherein the interface adaptation function entity is configured with multiple interfaces for interacting with the multiple certificate management function entities, and the multiple certificate management function entities include the target certificate management function entity.

22. The target certificate management function entity according to claim 19, wherein the target certificate management function entity and the interface adaptation function entity perform communication interaction through a transport layer security channel.

23. The target certificate management function entity according to claim 19, wherein the certificate is a registration certificate or an anonymous certificate.

24. A computer program product comprising computer-executable instructions that are stored on a non-transitory computer-readable medium and that, when executed by at least one processor, cause a terminal device to:
receive information about multiple certificate management function entities from an interface adaptation function entity;
select, based on the information about the multiple certificate management function entities, a target certificate management function entity from the multiple certificate management function entities;
in response to selecting the target certificate management function entity from the multiple certificate management function entities, send a certificate application parameter and information about the target certificate management function entity to the interface adaptation function entity;
in response to sending the certificate application parameter and the information about the target certificate management function entity to the interface adaptation function entity, receive a notification message indicating that a target interface for interacting with the target certificate management function entity is set in the interface adaptation function entity, wherein the notification message comprises a root certificate of the target certificate management function entity;
receive a first certificate request message from the interface adaptation function entity, wherein the first certificate request message comprises the certificate application parameter;
perform signature processing on the first certificate request message to generate a second certificate request message, wherein the second certificate request message comprises the certificate application parameter;
send the second certificate request message to the interface adaptation function entity;
receive a certificate from the interface adaptation function entity, wherein the certificate is configured by the target certificate management function entity for the terminal device;
decrypt the certificate by using the root certificate of the target certificate management function entity to generate a decrypted certificate;
determine whether the decrypted certificate includes a public key of the terminal device, wherein the public key is generated by the terminal device; and
in response to determining that the decrypted certificate includes the public key of the terminal device, determine that a certificate verification of the certificate succeeds.

25. The computer program product according to claim 24, wherein when executed by the at least one processor, the computer-executable instructions cause the terminal device to:
send information used to determine the target certificate management function entity to the interface adaptation function entity.

26. The computer program product according to claim 24, wherein the interface adaptation function entity is configured with multiple interfaces for interacting with the multiple certificate management function entities, and the multiple certificate management function entities include the target certificate management function entity.

27. The computer program product according to claim 24, wherein the terminal device and the interface adaptation function entity perform communication interaction through a transport layer security channel.

28. The computer program product according to claim 24, wherein the certificate is a registration certificate or an anonymous certificate.

* * * * *